US010736348B2

(12) United States Patent
Moh

(10) Patent No.: US 10,736,348 B2
(45) Date of Patent: Aug. 11, 2020

(54) THREE DIMENSIONAL PRINTING OF BIOTIC MATERIAL ORIGINATED FROM SWIFTLET EDIBLE BIRD NEST

(71) Applicants: Chee Boon Moh, Penang (MY); Chee Hong Moh, Penang (MY); Siew Hong Yip, Penang (MY)

(72) Inventor: Chee Boon Moh, Penang (MY)

( * ) Notice: Subject to any disclaimer, the term of this patent is extended or adjusted under 35 U.S.C. 154(b) by 233 days.

(21) Appl. No.: 15/859,782

(22) Filed: Jan. 2, 2018

(65) Prior Publication Data

US 2018/0184702 A1 Jul. 5, 2018

(30) Foreign Application Priority Data

Jan. 3, 2017 (MY) ............................ PI2017500001

(51) Int. Cl.

| | |
|---|---|
| ***A23P 20/20*** | (2016.01) |
| ***B33Y 70/00*** | (2020.01) |
| ***B33Y 10/00*** | (2015.01) |
| ***B33Y 30/00*** | (2015.01) |
| ***B33Y 80/00*** | (2015.01) |
| *A23P 20/25* | (2016.01) |

(52) U.S. Cl.

CPC ............... *A23P 20/20* (2016.08); *B33Y 10/00* (2014.12); *B33Y 30/00* (2014.12); *B33Y 70/00* (2014.12); *B33Y 80/00* (2014.12); *A23P 2020/253* (2016.08)

(58) Field of Classification Search

CPC ......... A23P 20/20; B33Y 10/00; B33Y 30/00; B33Y 70/00; B33Y 80/00

See application file for complete search history.

(56) References Cited

U.S. PATENT DOCUMENTS

2010/0139572 A1* 6/2010 Sia ......................... A01K 31/00 119/346

OTHER PUBLICATIONS

Ramji et al., Raffles Bullentin of Zoology, Roosting_and_nest-building_Behaviour_of_the_white-nest Swiftlet *Aerodramus fuciphagus* Thunberg *Aves apodidae* in farmed colonies, [online] Nov. 2013, retrieved Mar. 26, 2020. Retrieved from the Internet: URL: <https://lkcnhm.nus.edu.sg/app/uploads/2017/06/s29rbz225-235.pdf>.*

* cited by examiner

*Primary Examiner* — Viren A Thakur
*Assistant Examiner* — Chaim A Smith
(74) *Attorney, Agent, or Firm* — Christopher Pilling

(57) ABSTRACT

A system and method of printing a biotic material based object from a biotic material originated from swiftlet's edible bird nest, includes providing parameters of an object for printing; controlling a deposition of a fluid biotic material comprising a blend of water and nanometre-sized and/or micrometre-sized swiftlet edible bird nest particles to form the said object, wherein at least an outer surface region of the fluid biotic material is converted to a solid or semi-solid region after deposition & dehydration; and controlling a dehydration of said deposited fluid biotic material by accurately exposing the said deposited fluid biotic materials to a controlled environment. During and/or after the fluid biotic material deposition, an ultra-low humidity air stream is specifically channelled onto the freshly deposited fluid biotic material to accelerate the dehydration process and minimise the deposited biotic material based object or structure from deforming.

9 Claims, 19 Drawing Sheets

THREE DIMENSIONAL PRINTING OF BIOTIC MATERIAL ORIGINATED FROM SWIFTLET EDIBLE BIRD NEST

CROSS REFERENCE TO RELATED APPLICATIONS

The present application claims the benefit of Malaysian Patent Application No. PI 2017500001 filed on Jan. 3, 2017. All the above are hereby incorporated by reference.

TECHNICAL FIELD

This invention relates to a three-dimensional printing (3D) system and method of biotic or biological materials, and in particular, the printing of nanostructured biotic materials originated from swiftlet's edible bird nest.

BACKGROUND ART

In the last ten years, three-dimensional (3D) printing is evolving from developing prototypes to end-user products, mass customization and production of complex parts. Commercial application of three-dimensional (3D) printing, especially 3D printing of plastic or polymer materials is getting more popular and common nowadays. Today, there are many plastic or polymer materials 3D printing tools available, for example the popular "Makerbot", which extrudes polymers in a layer-by-layer fashion until a complex 3D product is completed.

However, application of 3D printing of foods or biological materials are not common, especially the application of precious biotic materials, which is rather an un-explored territory. Biotic material or biological derived material is material that originates from living organisms. Most such materials contain carbon and are capable of decay. Examples of biotic materials are wood, linoleum, straw, humus, manure, bark, cotton, spider silk, chitin, fibrin, bone and swiftlet edible bird nest.

The application of 3D printing of biotic products are much more complicated than typical plastic or polymer materials, each biotic material have their own unique and distinctive set of biological, physical and chemical properties, and each of these unique biotic materials needs a very specific set of 3D printing system and printing methodology to deliver a successful or a good quality and high yield printing results.

Some of biotic materials are very expensive materials, especially swiftlet's edible bird nest. Swiftlets are birds contained within the four genera *Aerodramus, Hydrochous, Schoutedenapus* and *Collocalia*. The genus *Aerodramus* is of special interest due to its use of echolocation and its intricately constructed saliva nests which in some species contain no other material such as feathers, moss or twigs. *Aerodramus Fuciphagus* is a small bird of the swift family which is found in South-east Asia.

The term "edible bird nest" used in this description includes bird nest made from regurgitated saliva of swiftlet. In particular, the edible bird nest that built by *Aerodamus Fuciphagus* swiftlet. A raw swiftlet edible bird nest comprising of dried saliva and/or dried saliva mixed with bird's feathers.

Swiftlet's edible bird nest or called "Yan Wo" is one of the very precious Traditional Chinese Medicine (TCM) ingredients. This TCM ingredient is consumed by Chinese for health improvement purposes since hundred years ago. Traditionally, the said swiftlet edible bird nest is harvested from cave, then cleaned, shaped and dried. Normally, the dried edible bird nest or "Yan Wo" is double boiled with sugar water and consumed in a liquid or semi-liquid form.

Typically, raw swiftlet edible bird nest will be going thru a long and tedious water based cleaning processes, then follow by a series of slow and highly labour intensive moulding and drying processes to make them into many different shapes and sizes before they were sold to the consumers.

Generally, edible bird nest moulding or shaping process is a very time consuming process mainly due to the nature of the works, which the worker needs to manually arrange and match many long, short and tiny edible bird nest textures or straps before "beautifully" shaping them into a desired shape. Therefore, the said moulding or shaping process need a seasoned and very skilful worker to deliver a "beautifully" shaped edible bird nest.

In fact, three most important parameters determining edible bird nest products pricing are their shape, texture and size. The main objective of this invention is to overcome edible bird nest processing challenges to deliver the best shape, texture and size, particularly in improving the moulding, shaping and texture/straps arranging processes.

DISCLOSURE OF INVENTION

It is a primary object of the present invention to provide a cost effective system and method for printing biotic materials originated from swiftlet edible bird nest. The invention aims to improve quality, yield, capacity, productivity and cost of swiftlet edible bird nest processing, particularly in simplifying the moulding, shaping and texture/straps arranging processes thru a novel three dimensional printing methodology and system.

The present invention includes a method of printing biotic material based object from biotic material originated from swiftlet edible bird nest, where the said biotic material consists of micrometre-sized and/or nanometre-sized swiftlet edible bird nest particles. The said micrometre-sized and/or nanometre-sized swiftlet edible bird nest particles are having very small grains size, the small grain size uniquely contributed to material properties improvement on said biotic material based printed object. A significant optical (transparency) and mechanical properties improvement are observed on the said biotic material based printed object. The said nanometre-sized particles are in the range of approximately 1 to 999 nanometres. The said micrometre-sized particles are in the range of 1 to 999 micrometres.

The proposed method comprises of providing parameters of an object for printing, and controlling a deposition of a fluid biotic material comprising a blend of water and micrometre-sized and/or nanometre-sized biotic material particles to form the said biotic material based object. Wherein at least an outer surface region of the said fluid biotic material is converted to a solid or semi-solid region after deposition and subsequent dehydration process. The said fluid biotic material may include other edible materials as well.

During and/or after the said fluid biotic material deposition, an ultra-low humidity air stream is specifically channelled onto the freshly deposited fluid biotic material to speed up the dehydration process and minimise the deposited biotic material based object or structure from deforming. The said ultra-low humidity air stream could channelled thru an air filtering system, air cooling system, and/or air sanitising system for air filtering, cooling and sanitising purposes.

The proposed method in this invention includes controlling a deposition of the fluid biotic material comprises controlling a pressure and/or flow rate of the fluid biotic material while simultaneously controlling a deposition location of the fluid biotic material such that deposited biotic material forms the object. The method also includes controlling a deposition of the fluid biotic material comprises depositing an initial portion of the fluid biotic material, and then depositing a next portion of the fluid material on the initial portion after at least an outer surface region of the initial portion is converted to a solid or semi-solid region, the said depositing steps are repeat for subsequent deposition of said fluid biotic material.

The proposed method in this invention includes depositing globules of the fluid biotic material comprises depositing stacks of connected globules that together form a three-dimensional object, wherein an optimum globule size is approximately ranging from 1 micrometre to 1 centimetre in diameter.

Preferably, the said proposed method includes controlling deposition of a fluid biotic material stream from a fluid biotic material deposition nozzle. The proposed method includes controlling said fluid biotic material heating and/or cooling at said fluid biotic material deposition nozzle before and/or during deposition. In addition, the proposed method includes controlling water evaporation from said fluid biotic material at said fluid biotic material deposition nozzle before and/or during deposition.

The present invention proposed a system for printing biotic material based object from biotic material originated from swiftlet edible bird nest, the system comprising a deposition system having a fluid biotic material reservoir and a fluid biotic material deposition nozzle for dispensing a fluid biotic material comprising a blend of water and micrometre-sized and/or nanometre-sized biotic material particles; and a centre controller configured to control the deposition of the fluid biotic material so as to form a solid structure that at least an outer surface region of the fluid biotic material is converted to a solid or semi-solid region after deposition and subsequent dehydration process. The said centre controller is configured to control a deposition of the fluid biotic material by controlling a pressure and/or flow rate of the material while simultaneously controlling a deposition location of the material such that deposited material forms the object. A fluid biotic material deposition system controller could be included in the present invention to facilitate the deposition process together with the said centre controller.

Preferably, the present invention includes a unique dehydration systems, which comprises of a water evaporator at the fluid biotic material deposition nozzle, an ultra-low humidity air stream nozzle and a low humidity tunnel in an enclosed working chamber. The said fluid biotic material is deposited in a controlled environment at said enclosed working chamber, which circulated with dehumidified, cooled, filtered and/or sanitised air to avoid the said fluid biotic material from degrading during the deposition and dehydration processes. An inert gas, ozone gas, or other gas mixture may injected into the said working chamber to better prevent said deposited fluid biotic material from degrading.

The said enclosed working chamber of said invention consists of a waiting station, a depositing station and a dehydrating station. The said depositing station is located between said waiting station and said dehydrating station. A deposition platform is transfers from said waiting station to said depositing station, then transfers to said dehydrating station on a working chamber conveyor system located in the said working chamber.

This invention includes a multi-axis robotic mechanism at said depositing station, wherein said ultra-low humidity air stream nozzle and said fluid biotic material deposition nozzle are attached to a nozzle gripper on said multi-axis robotic mechanism. In this invention, said centre controller is configured to control said multi-axis robotic mechanism to continue position the said ultra-low humidity air stream nozzle and said fluid biotic material deposition nozzle to a plurality of pre-defined deposition locations for deposition process.

Preferably, the said fluid biotic material deposition nozzle could equipped with a heating/cooling element to heat-up/cool-down the said fluid biotic materials immediately before the deposition. Besides, the said ultra-low humidity air stream nozzle is located in close proximity to said fluid biotic material deposition nozzle to enable the said ultra-low humidity air stream accelerate the dehydration process immediately after the deposition.

In the proposed system, the said fluid biotic material is deposited on said deposition platform sitting on said conveyor system at said depositing station. A detachable tray shall place on said deposition platform, which allow the said fluid biotic material to be deposited on said detachable tray. The deposited fluid biotic material on the said detachable tray or the said deposition platform will enter said low humidity tunnel located next to said depositing station to further enhance the dehydration process.

In this invention, a deposition platform identification system is integrated to identify said deposition platforms. The said deposition platform identification system consists of a plurality of deposition platform, a deposition platform identification tag/sticker and a deposition platform identification reader/scanner. Generally, said deposition platform identification system is a Radio Frequency Identification (FRID) system or a Barcode Identification (BI) system. The said RFID tag or BI sticker is glued onto a designated space at one of the side of said deposition platform. The said RFID reader or BI scanner will read or scan the said RFID tag or BI sticker, decode the information and update the information to said centre controller. The said deposition platforms information will be submitted to the said centre controller for processing before a depositing instruction is given to the said deposition system. However, the deposition platform identification system is not limited to RFID or BI system, it may include other type of identification system.

In this invention, operation of all sub-systems include said fluid biotic material deposition system, said multi-axis robotic mechanism, said conveyor system, said deposition platform identification system and said dehydration system (air dehumidifying, air filtering, air cooling and air sanitizing) are being monitored and controlled by said centre controller. A machine operator or technician will be communicating with the said centre controller thru a Man-Machine Interface Unit (MMIU), which is located in front of the said working chamber.

The above and other objects, features, aspects and advantages of the present invention will become clearer from the following detailed description of the present invention when taken in connection with the accompanying drawings. The drawings are for purpose of illustration only and not intended as a definition of the limits of the invention. It being understood that various changes in the details may be made without departing from the spirit and advantages of the present invention.

BRIEF DESCRIPTION OF DRAWINGS

Embodiments of the invention are represented in the drawings and described in greater detail in the following description, in which drawings.

DETAIL DESCRIPTION OF INVENTION

Figure 1:
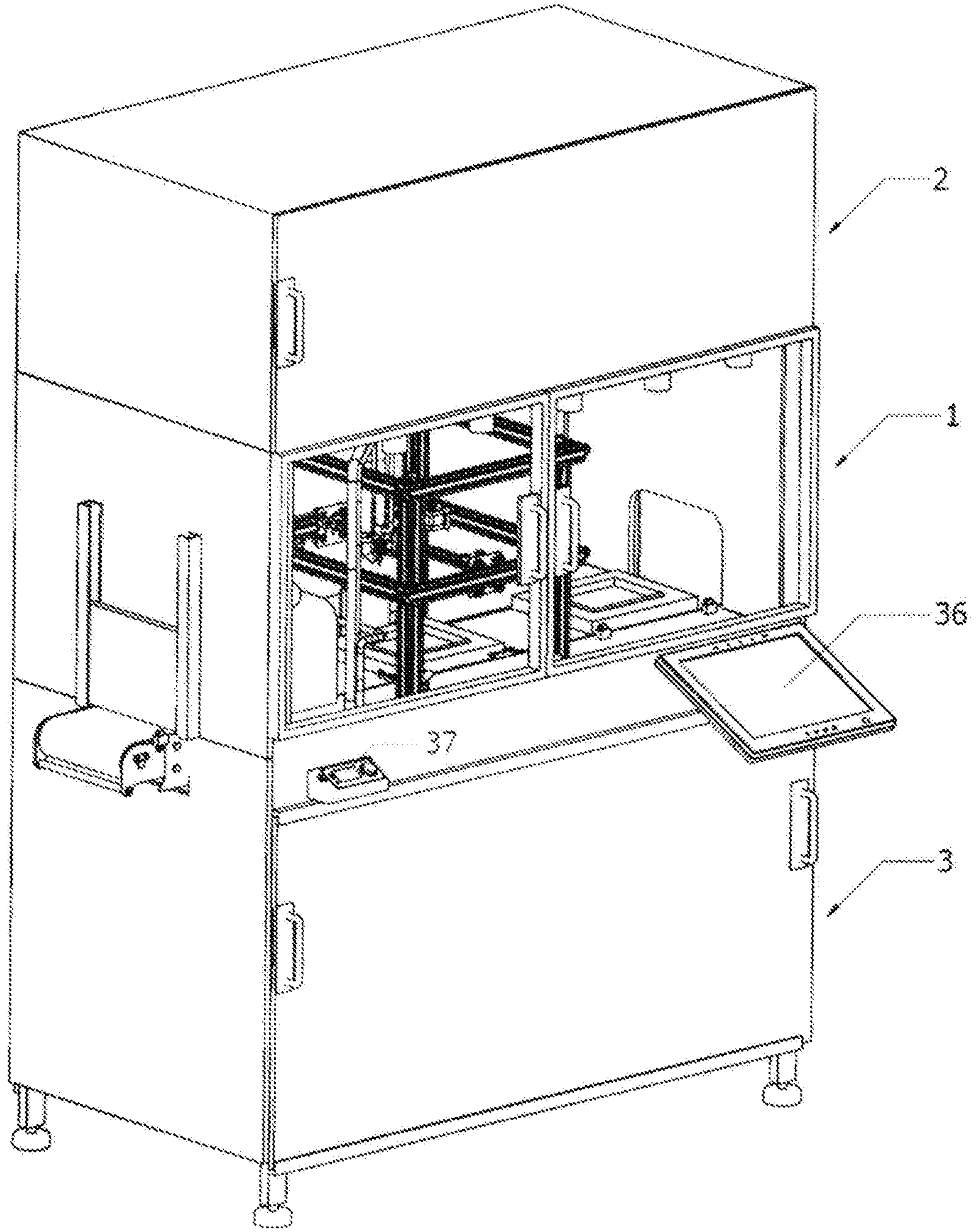
FIG. 1 shows a perspective view of a system for three dimensional printing of biotic materials in accordance with the present invention.
Figure 2:
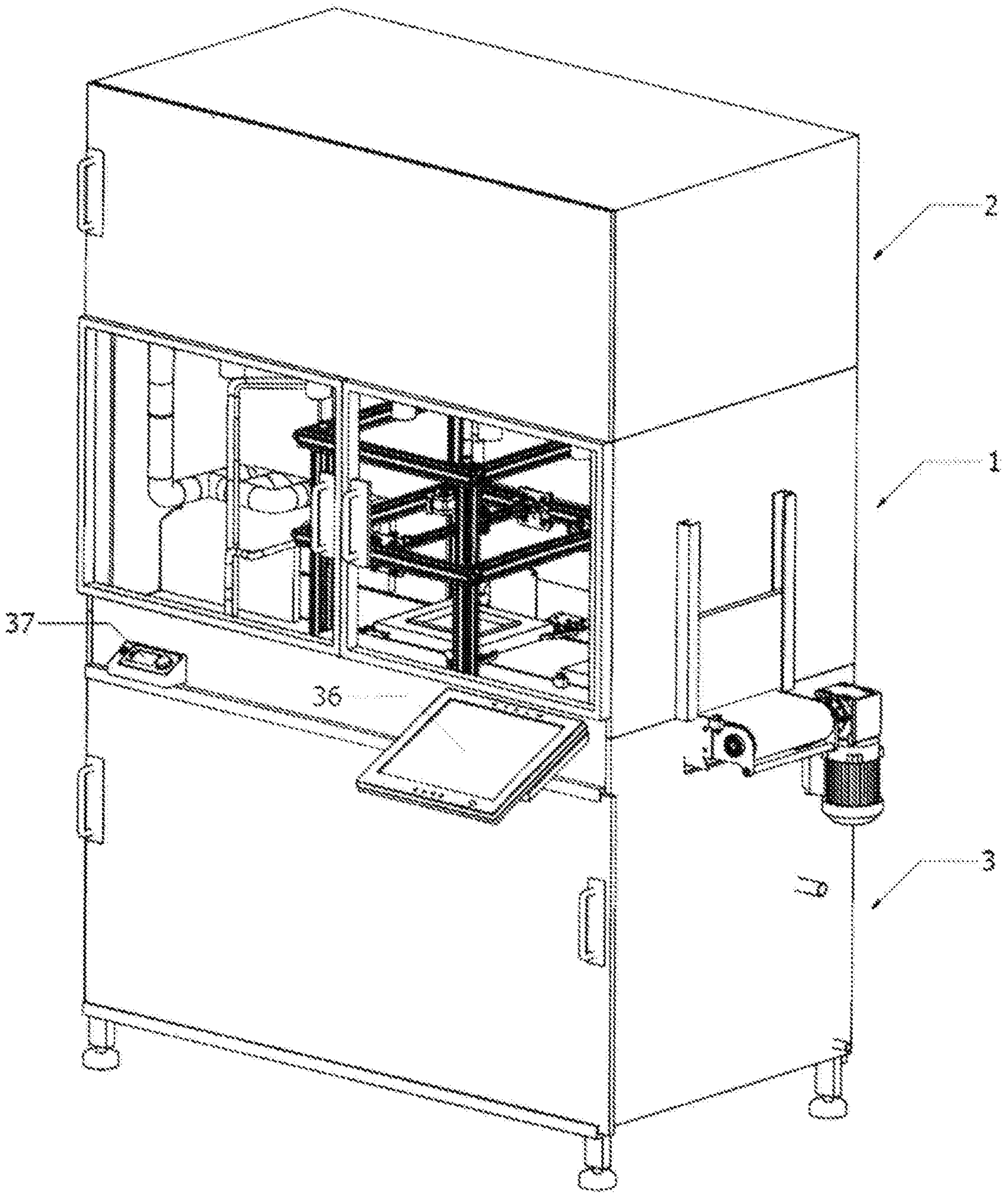
FIG. 2 shows another perspective view of a system for three dimensional printing of biotic materials in accordance with the present invention.
Figure 3:
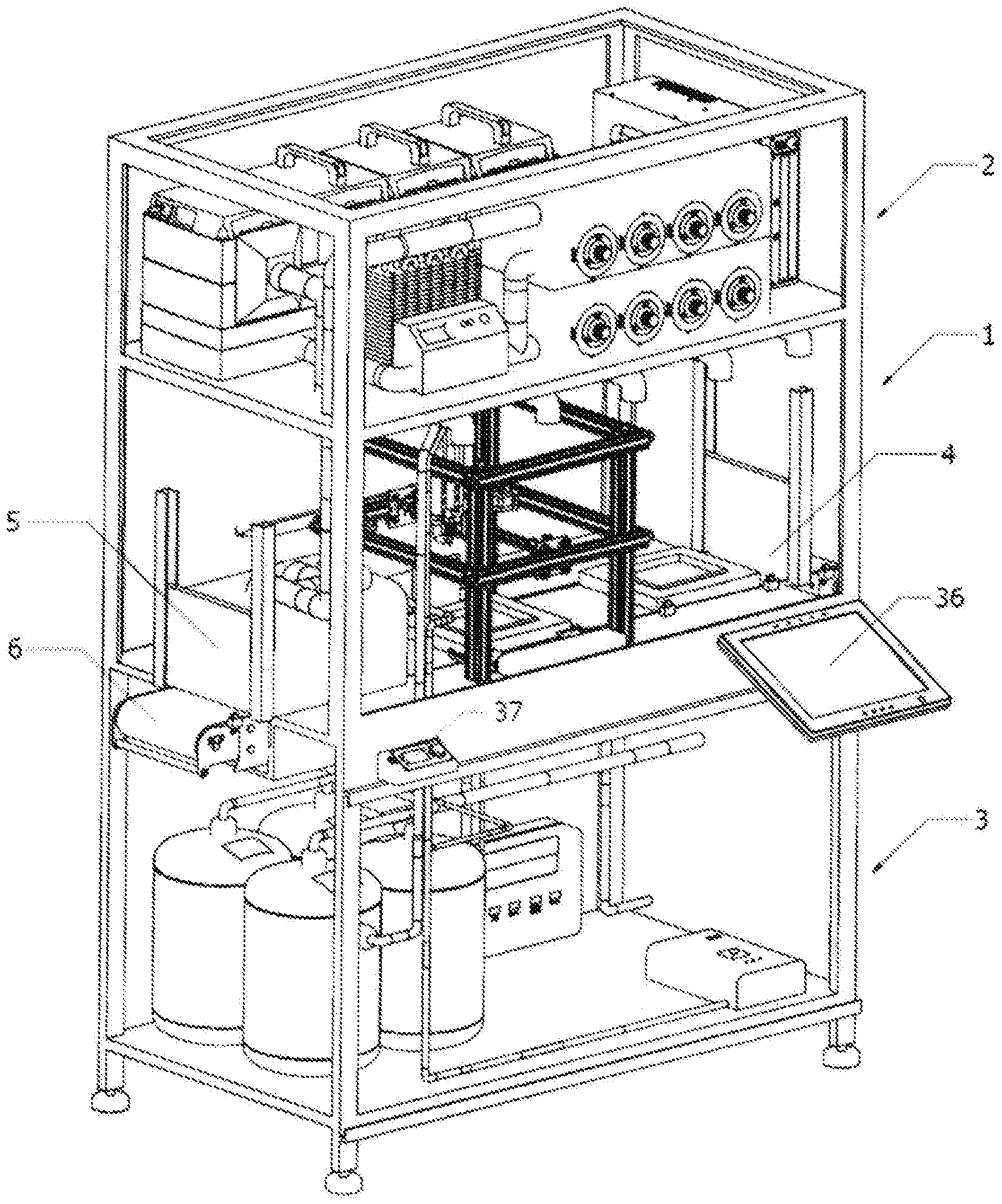
FIG. 3 shows a perspective view of a system (without covers and doors) for three dimensional printing of biotic materials in accordance with the present invention.
Figure 4:
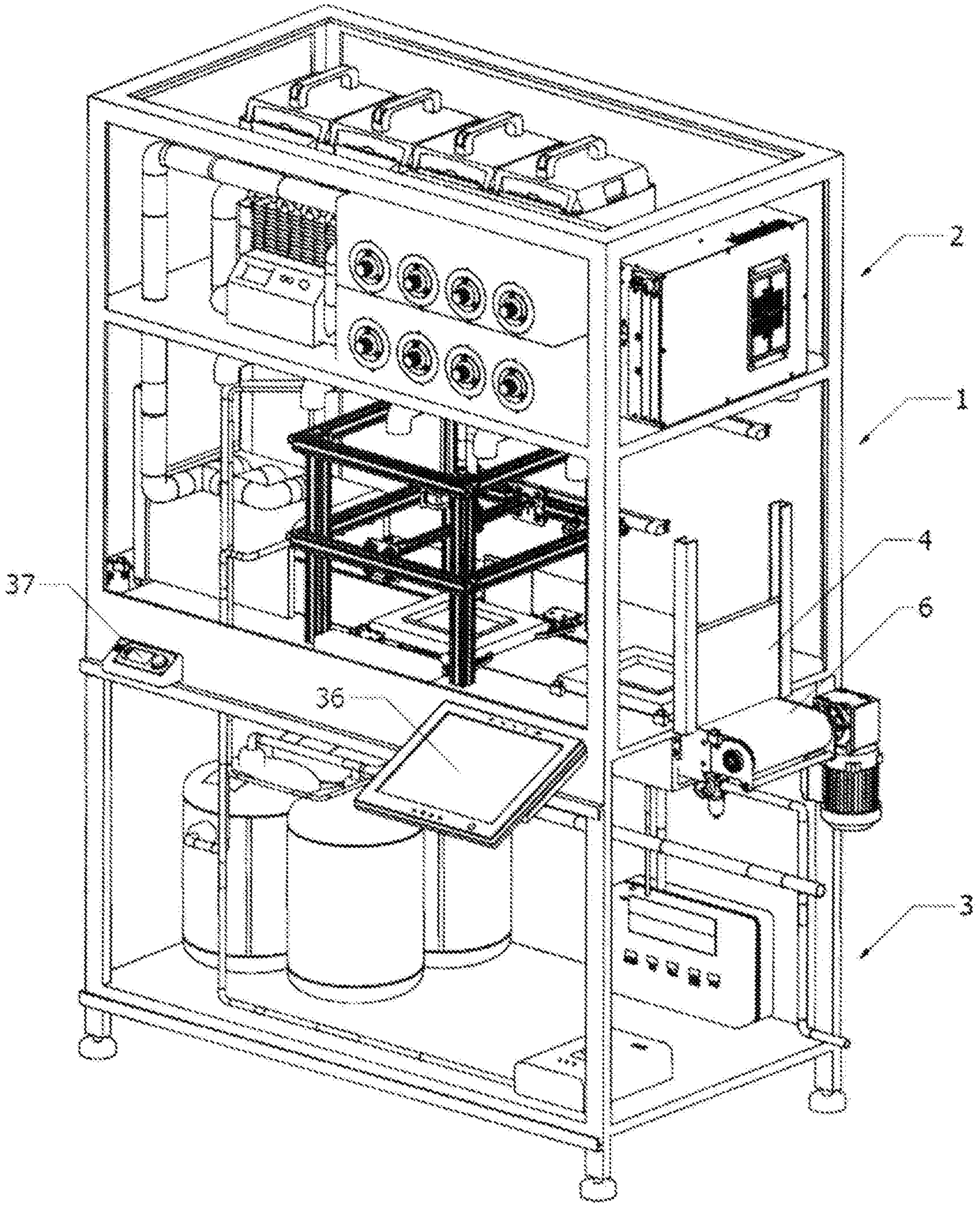
FIG. 4 shows another perspective view of a system (without covers and doors) for three dimensional printing of biotic materials in accordance with the present invention.

A system of printing biotic materials based objects from biotic materials originated from swiftlet edible bird nest according to the present invention is shown in FIG. 1 and FIG. 2. Referring to both FIG. 1 and FIG. 2, the said system generally comprises of a working chamber 1, an upper chamber 2 and a lower chamber 3.

As shown in FIG. 3, FIG. 4, FIG. 5 and FIG. 6 in this invention, the said working chamber 1 includes an entry gate 4, an exit gate 5, a working chamber conveyor system 6 and three working stations. Referring to both FIG. 5 and FIG. 6, the first working station is a waiting station 7, the second working station is a depositing station 8 and the third working station is a dehydrating station 9. The said working chamber conveyor system 6 is included in this invention to transfer a plurality of deposition platforms 10 from one working station to another working station. The said deposition platform 10 first transfers from said entry gate 4 to said waiting station 7, then transfers to said depositing station 8, subsequently transfer to said dehydrating station 9 and finally transfers to said exit gate 5.

The proposed method according to the present invention comprises of providing parameters of an object for printing, and controlling a deposition of a fluid biotic material. Wherein at least an outer surface region of the said fluid biotic material is converted to a solid or semi-solid region after deposition and subsequent dehydration process. The said fluid biotic material may include other edible materials as well.

Said parameters of said object for printing is provided to the said biotic material based object printing system via a Man-Machine Interface Unit (MMIU) 36 as shown in FIG. 1, FIG. 2, FIG. 3 and FIG. 4.

Figure 5:
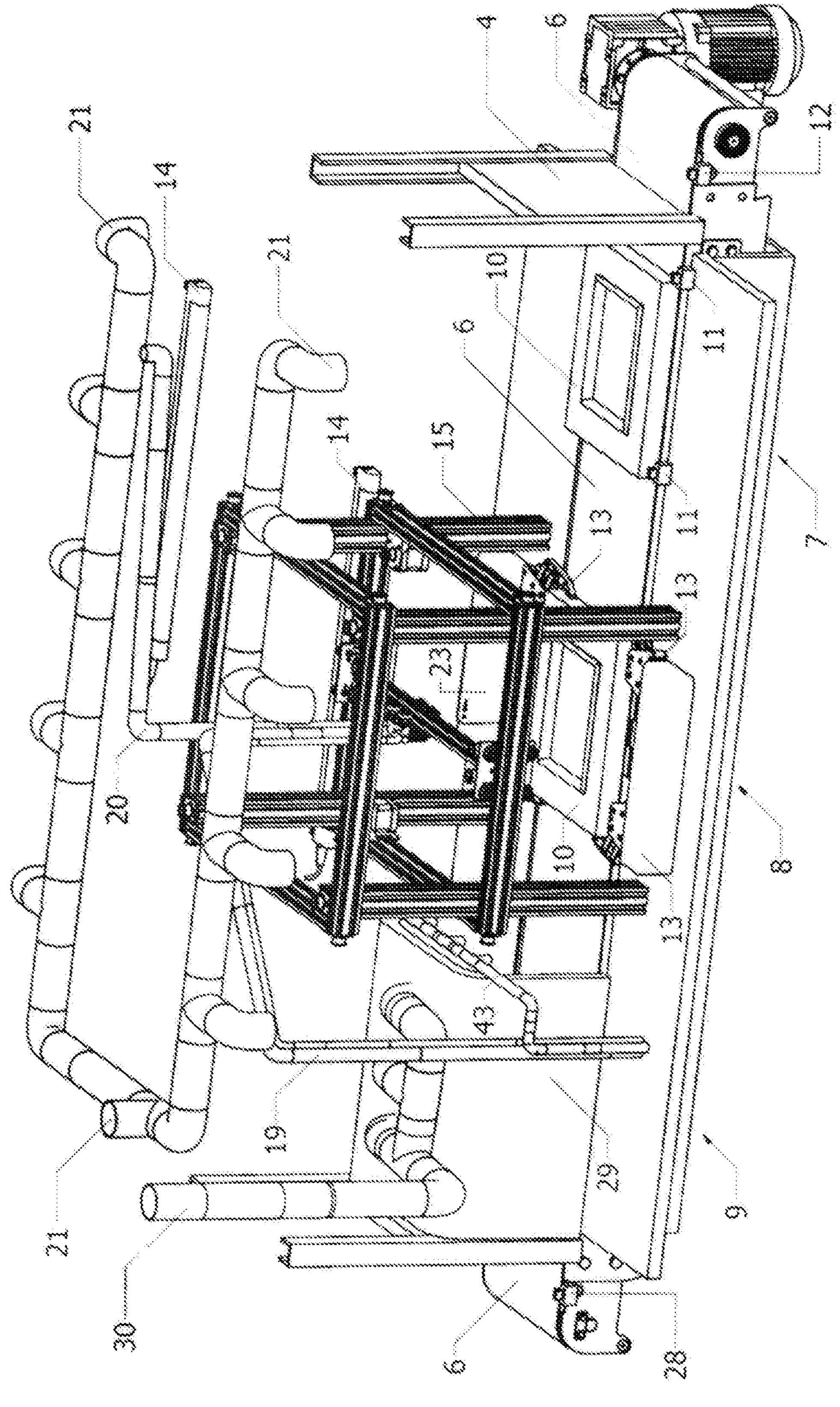
FIG. 5 shows a perspective view of a working chamber (without covers and doors) of said system for three dimensional printing of biotic materials in accordance with the invention.
Figure 6:
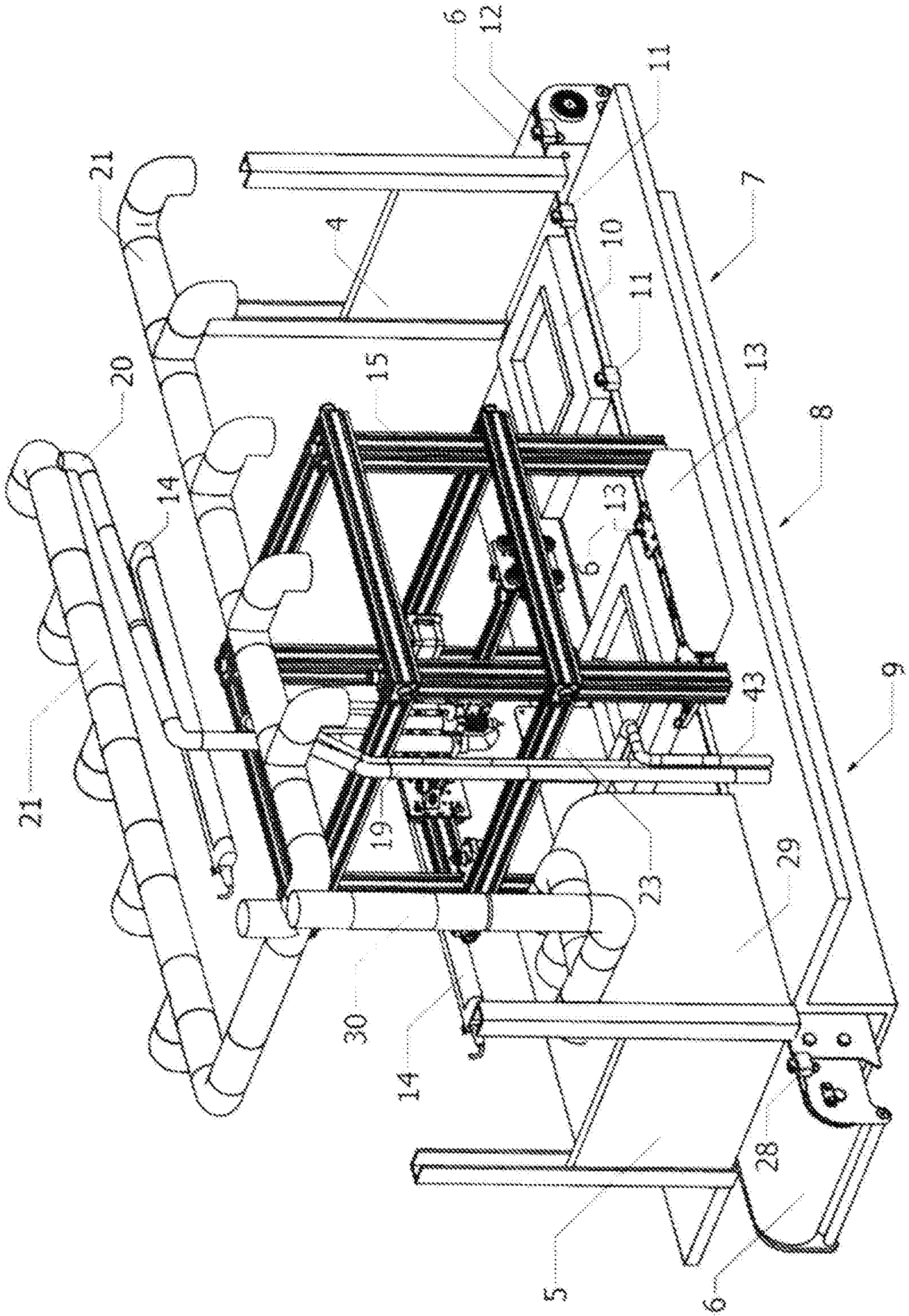
FIG. 6 shows another perspective view of a working chamber (without covers and doors) of said system for three dimensional printing of biotic materials in accordance with the present invention.
Figure 11:
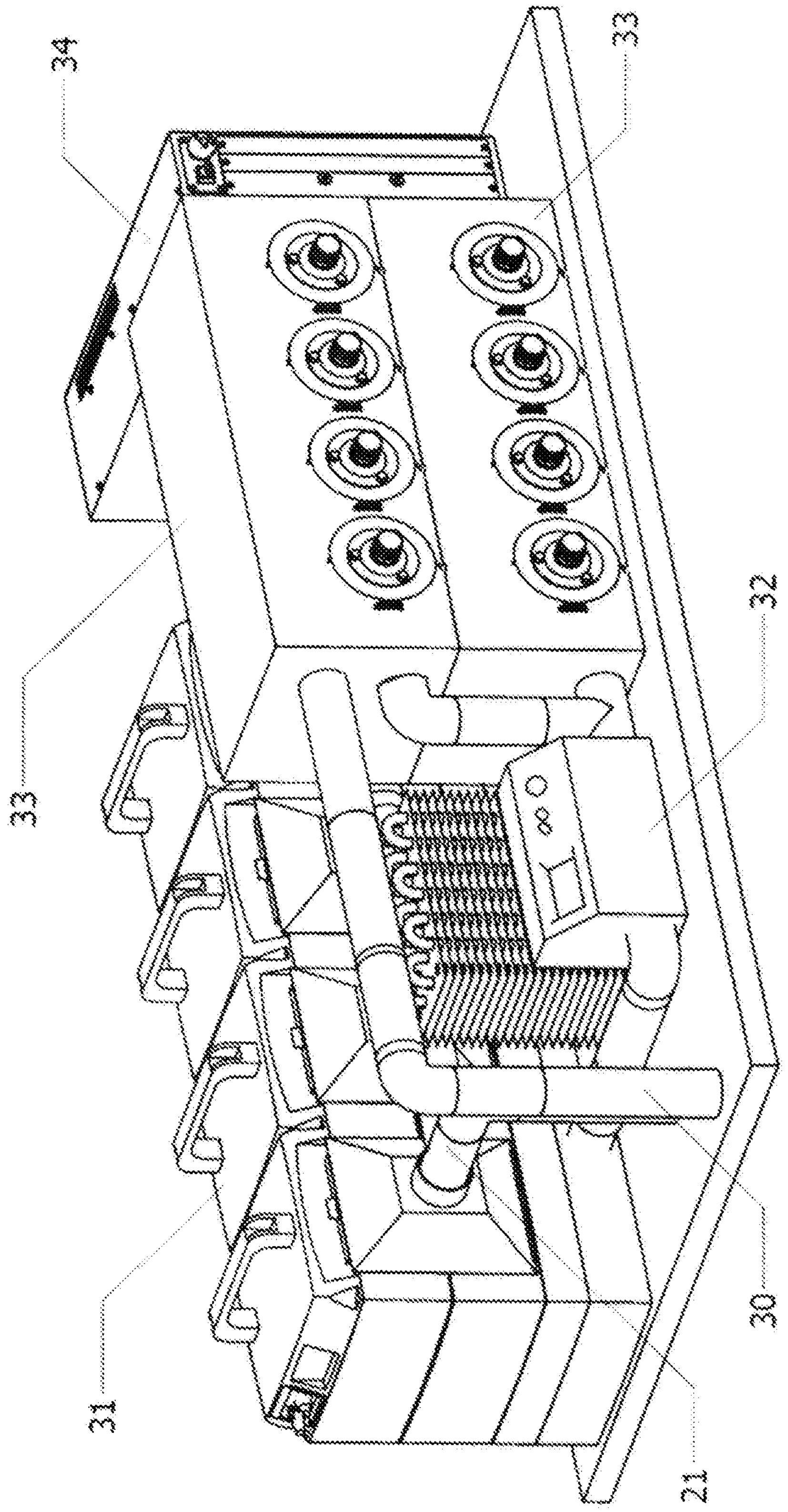
FIG. 11 shows a perspective view of an upper chamber (without covers and doors) of said system for three dimensional printing of biotic materials in accordance with the present invention.
Figure 12:
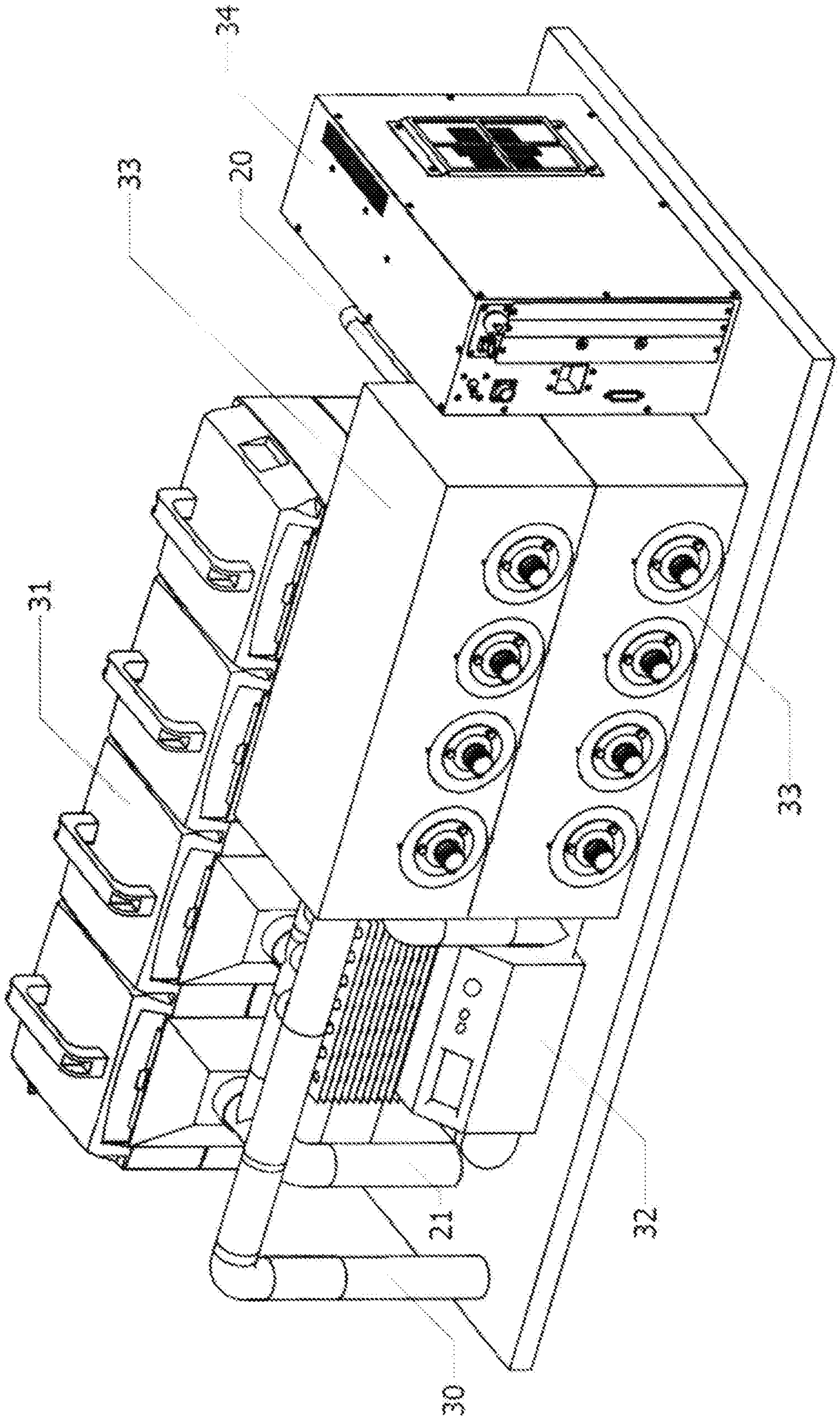
FIG. 12 shows another perspective view of an upper chamber (without covers and doors) of said system for three dimensional printing of biotic materials in accordance with the present invention.

As illustrated in FIG. 5 and FIG. 6, the said depositing station 8 further comprising a fluid biotic material piping 19, an ultra-low humidity air stream piping 20, and a return air piping 21. The said fluid biotic material piping 19 is connected to a fluid biotic material reservoir 35 located at said lower chamber 3. The said ultra-low humidity air stream piping 20 is connected to an air filtering system 31, air cooling system 32 and/or air dehumidifying system 33 located at upper chamber 2 as shown in FIG. 11 and FIG. 12.

During and/or after the said fluid biotic material deposition, an ultra-low humidity air stream is specifically channelled onto the freshly deposited fluid biotic material via a ultra-low humidity air stream nozzle 18 to accelerate the dehydration process and minimise the deposited biotic material based object or structure from deforming. The said ultra-low humidity air stream could channelled thru said air filtering system 31, air cooling system 32, and/or air sanitising system for air filtering, cooling and sanitising purposes.

The proposed method in this invention includes controlling a deposition of the fluid biotic material comprises controlling a pressure and/or flow rate of said fluid biotic material while simultaneously controlling a deposition location of the said fluid biotic material such that deposited biotic material forms the object. The method also includes controlling a deposition of the fluid biotic material comprises depositing an initial portion of the fluid biotic material, and then depositing a next portion of the fluid material on the initial portion after at least an outer surface region of the initial portion is converted to a solid or semi-solid region, the said depositing steps are repeat for subsequent deposition of said fluid biotic material.

The proposed method in this invention includes depositing globules of the fluid biotic material comprises depositing stacks of connected globules that together form a three-dimensional object, wherein an optimum globule size is approximately ranging from 1 micrometre to 1 centimetre in diameter.

Figure 7:
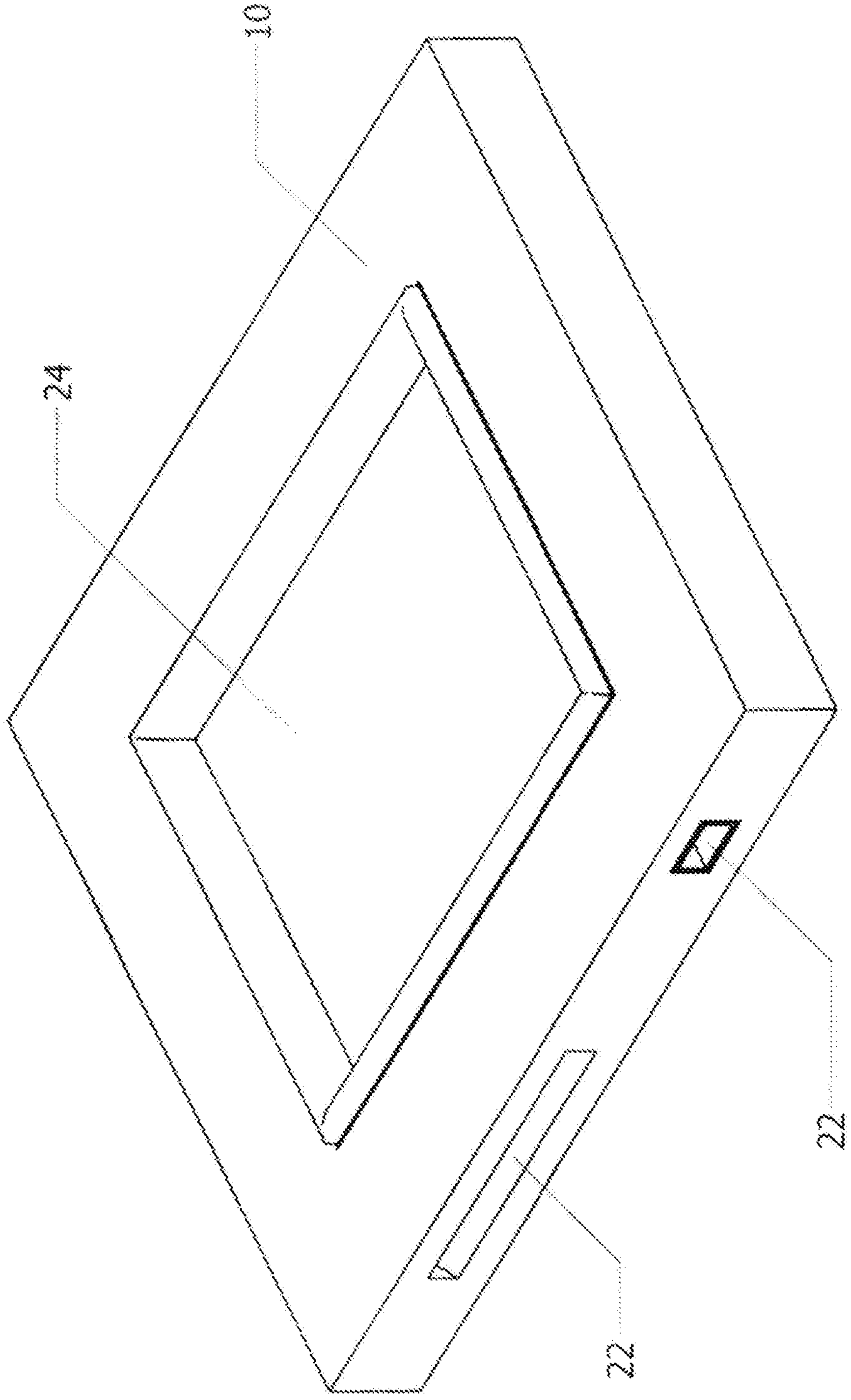
FIG. 7 shows a perspective view of a deposition platform with a detachable tray in accordance with the present invention.
Figure 9:
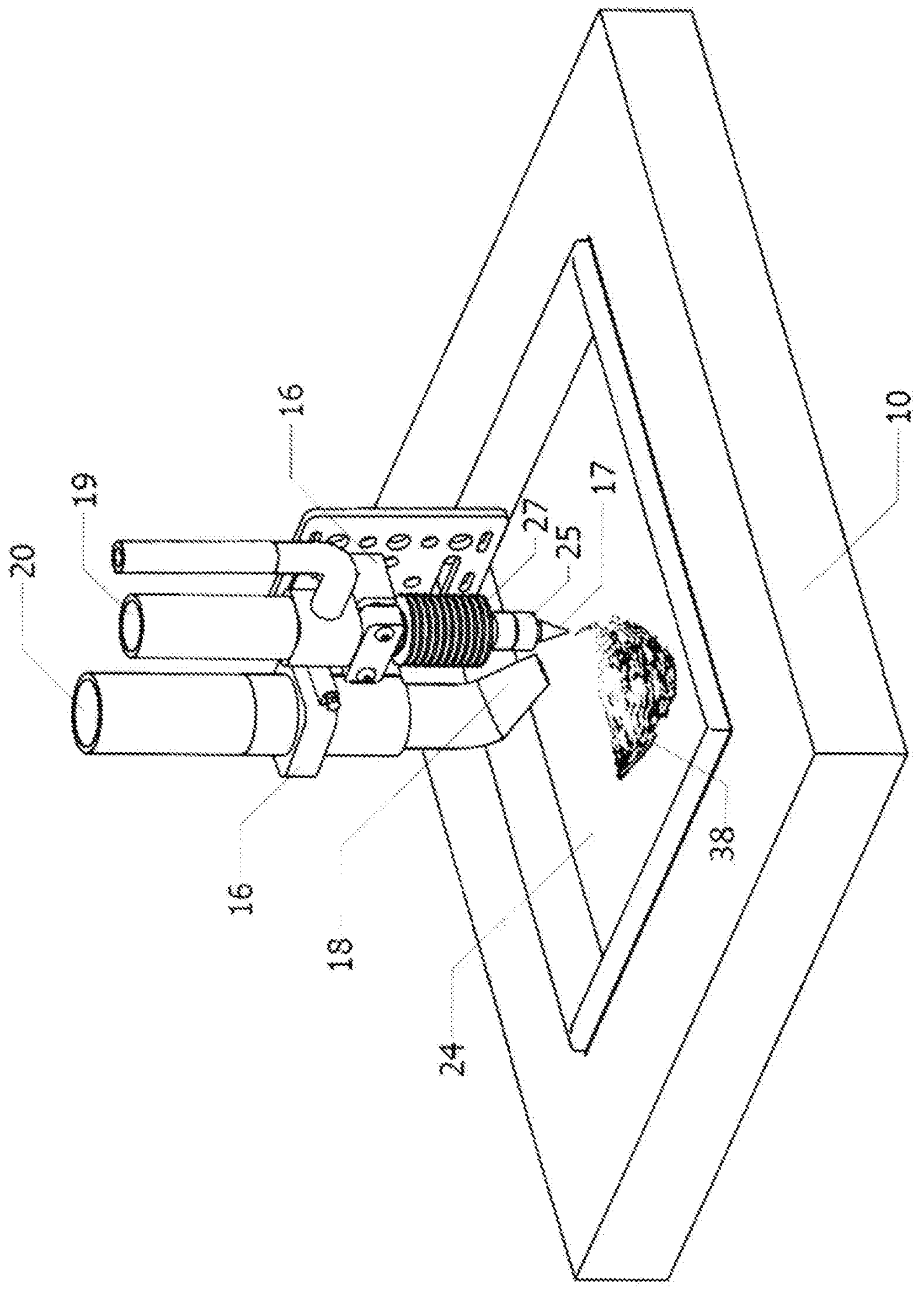
FIG. 9 shows a perspective view of a deposition nozzle (with cooling element), an ultra-low humidity air stream nozzle, a deposition platform and a printed object in accordance with the present invention.
Figure 10:
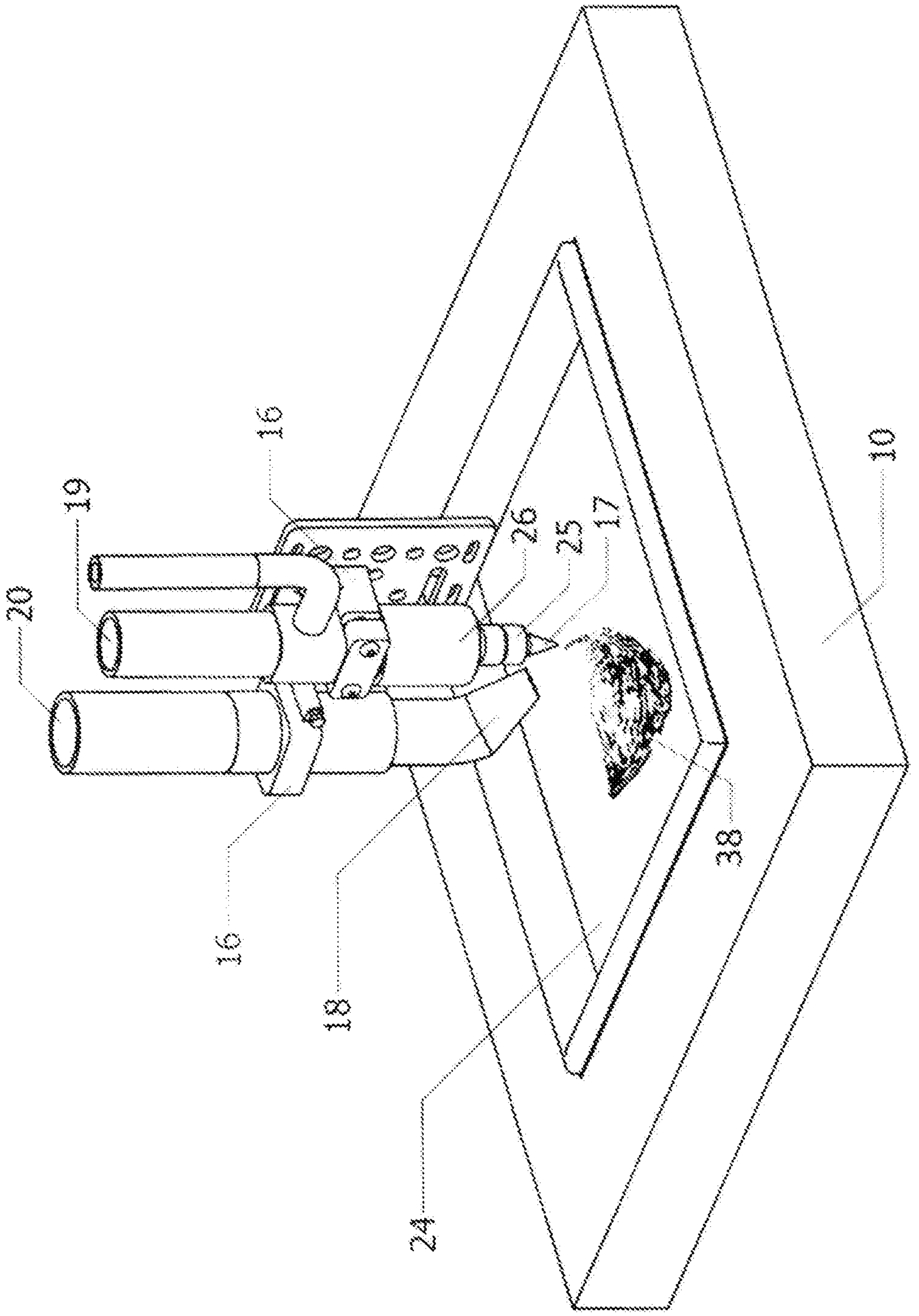
FIG. 10 shows a perspective view of a deposition nozzle (with heating element), an ultra-low humidity air stream nozzle, a deposition platform and a printed object in accordance with the present invention.

As illustrated in FIG. 7, a detachable tray 24 is sit or place on a cavity at said deposition platform 10, which allow said fluid biotic material to be deposited on said detachable tray 24. In the present invention, the said fluid biotic material uniquely comprising of a blend of water and micrometre-sized and/or nanometre-sized swiftlet edible bird nest particles. The said micrometre-sized and/or nanometre-sized swiftlet edible bird nest particles are having very small grain size, which uniquely contributed to material properties improvement on a printed object 38 as shown in FIG. 9 and FIG. 10. A significant optical (transparency) and mechanical properties improvement are observed on the said biotic material based printed object 38. The said properties improvement is mainly due to high surface-to-volume ratio and intensifying of intermolecular interaction. The intensified intermolecular interaction in said fluid biotic material actually changed the properties of said water and swiftlet edible bird nest particles blend, which improved the material properties of the said printed object 38. A nanophase is too small relative to the wavelength of visible light to scatter the light and increase opacity. Said nanometre-sized swiftlet edible bird nest particles are having very small grain size, typically in the range of approximately 1 to 999 nanometres. However, said micrometre-sized particles are having a relatively larger grain size at about 1 to 999 micrometres.

Generally, said working chamber 1 shown in FIG. 1, FIG. 2, FIG. 3 and FIG. 4 is a controlled environment chamber; where said working chamber humidity, temperature, pressure, as well as air composition and cleanliness are being monitored and controlled by a centre controller called Centre Controller Unit (CCU) 34. The said fluid biotic material is deposited in said controlled environment at said working chamber, which circulated with dehumidified, cooled, filtered and/or sanitised air to avoid the said fluid biotic material from degrading during the deposition and dehydration processes. An inert gas, ozone gas, or other gas mixture may injected into the said working chamber to better prevent said deposited fluid biotic material from degrading.

The said Centre Controller Unit (CCU) 34 is equipped with an operating software and is responsible to monitor and control all the operation of the said biotic material based object printing system according to the present invention. Besides, said Man-Machine Interface Unit (MMIU) 36 is included in this invention to ease a user or technician to operate the said printing system and also to allow a user or technician to communicate with or to upgrade said operating software of the said printing system. The said Man-Machine Interface Unit (MMIU) 36 is located in front of the said working station 1. In additional, an emergency switch 37 is also located in front of the working station as shown in FIG. 1, FIG. 2, FIG. 3 and FIG. 4.

As illustrated in FIG. 5 and FIG. 6, said waiting station 7 in the present invention is to receive a deposition platform 10, which is waiting to be transferred to said depositing station 8 for depositing process. There are a plurality of waiting station proximity sensors 11 at said waiting station 7 to detect the present of deposition platform 10 at said waiting station 7. There are also a plurality of entry gate proximity sensors 12 located near to said entry gate 4 to detect the present of deposition platforms 10 or other objects at the said entry gate 4.

Figure 8:
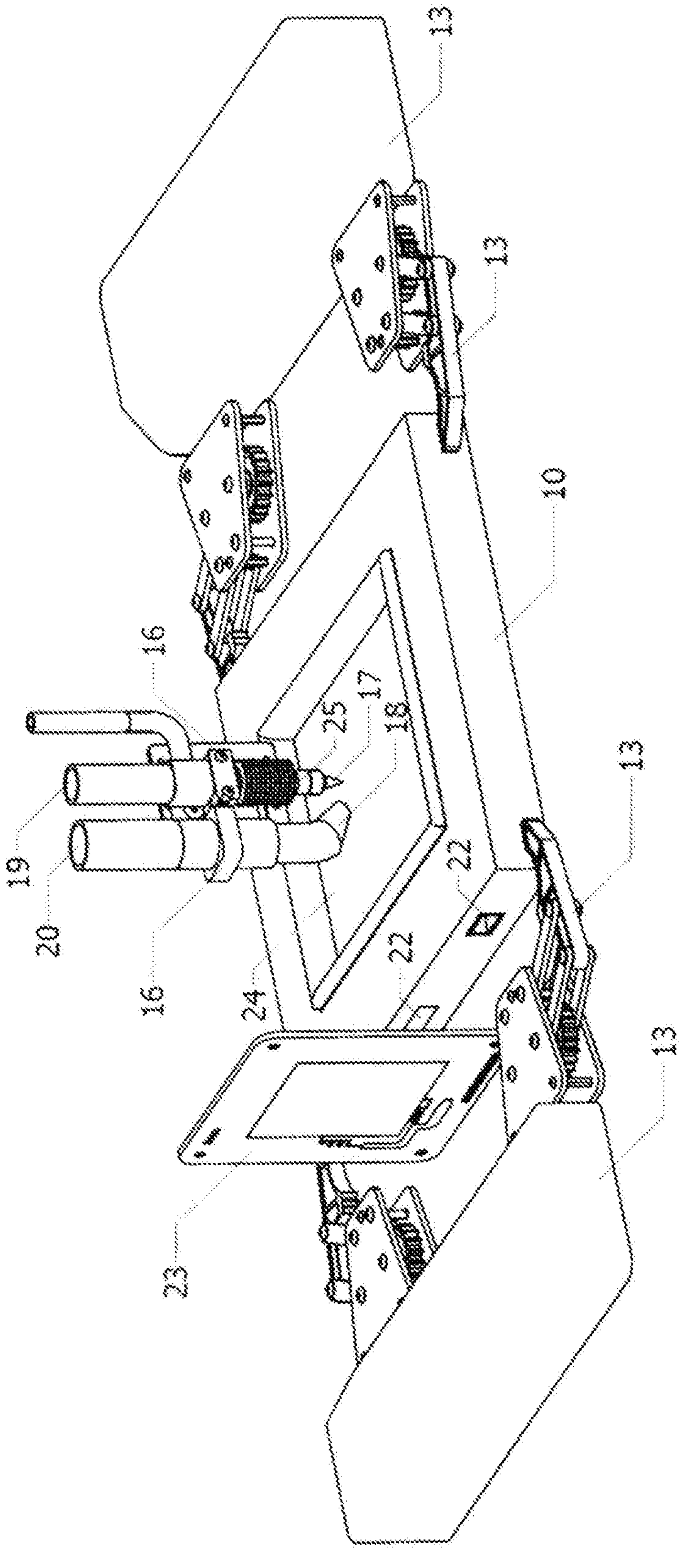
FIG. 8 shows a perspective view of a deposition nozzle, an ultra-low humidity air stream nozzle, a deposition platform, a deposition platform clamping mechanism and a deposition platform identification system in accordance with the present invention.

As illustration shown in FIG. 5, FIG. 6 and FIG. 8 and according to present invention, said depositing station 8 comprising of a fluid biotic material deposition system, a deposition platform clamping system 13, a deposition platform identification system and an ultraviolet light sanitizing system 14. The said fluid biotic material deposition system consists of a fluid biotic material reservoir 35, a fluid biotic material piping 19, a fluid biotic material deposition nozzle 17, an ultra-low humidity air stream nozzle 18, a nozzle gripper mechanism 16 and a multi-axis robotic mechanism 15.

In this invention said ultra-low humidity air stream nozzle 18 and said fluid biotic material deposition nozzle 17 are attached to a nozzle gripper mechanism 16 on said multi-axis robotic mechanism 15. Besides, a deposition system controller 39 and said Centre Controller Unit (CCU) 34 are configured to control said multi-axis robotic mechanism to position the said ultra-low humidity air stream nozzle 18 and said biotic material deposition nozzle 17 to a plurality of pre-programmed deposition locations for depositing process.

As shown in FIG. 8, FIG. 9 and FIG. 10, the said fluid biotic material deposition nozzle 17 is equipped with a water evaporator 25 at the said fluid biotic material nozzle tip to partially dehydrate the said fluid biotic material before and/or during deposition. The partially dehydrated fluid biotic material significantly enhance the subsequent dehydration process and minimise deposited structure from deforming.

The said fluid biotic material deposition nozzle 17 is further equipped with a heating element 26 or a cooling element 27 to heat-up or cool down the said fluid biotic material at said fluid biotic material deposition nozzle 17 before and/or during deposition. Besides, the said ultra-low humidity air stream nozzle 18 is located in close proximity to said fluid biotic material nozzle 19 to enable the said ultra-low humidity air stream significantly accelerate the dehydration process immediately after the deposition.

In this invention, a deposition platform identification system is integrated to identify said deposition platforms. Practically, said depositing process could be repeated on a particular deposition platform 10. This is mainly due to said printing or depositing programme could include globule-by-globule or portion-by-portion depositing steps on the particular deposition platform 10. Therefore, it is critical to be able to systematically identify each of the deposition platforms 10 and their activities history records. The said deposition platform identification system consists of a plurality of deposition platforms 10, a deposition platform identification tag/sticker 22 and a deposition platform identification reader/scanner 23 as shown in FIG. 8. Generally, said deposition platform identification system is a Radio Frequency Identification (FRID) system or a Barcode Identification (BI) system. The said RFID tag or BI sticker 22 is glued onto a designated location at one of the side of said deposition platform 10 as shown in FIG. 7 and FIG. 8. However, the said deposition platform identification system is not limited to RFID system or BU system, it could include other type of identification system. The said RFID reader or BI scanner 23 will read or scan the said RFID tag or BI sticker 22. Then, the said deposition platform identification system will decode the said deposition platform information, which includes all the activities history of said deposition platform 10. All the said decoded information will be updated to said Centre Controller Unit (CCU) 34 for further action. The detail information is crucial for the said Centre Controller Unit (CCU) 34 to decide and take action.

According to present invention, said dehydrating station 9 comprising of an exit gate 28, a low humidity tunnel 29, a low humidity air stream piping 30, a low humidity tunnel ultraviolet light sanitizing system and an Ozone gas outlet. After deposition, said deposition platform 10 will be transferred from said depositing station 8 to said low humidity tunnel 29 at said dehydrating station 9 for dehydrating process. The said low humidity tunnel 29 is circulated with a low humidity air stream at approximately 5% to 35% relative humidity. The said low humidity air stream is supply to said low humidity tunnel 29 thru a low humidity air stream piping 30 located at said working chamber 1 and connected to said air dehumidifying system 33 at said upper chamber 2 as shown in FIG. 5, FIG. 6, FIG. 11, and FIG. 12.

There are a plurality of proximity sensors in said low humidity tunnel 29 to detect the present of deposition platform 10. There are also a plurality of exit gate proximity sensors 28 located near to said exit gate 5 to detect the present of deposition platforms 10 or other objects at the said exit gate 5.

Referring to FIG. 11 and FIG. 12, said upper chamber 2 consists of an air filtering system 31, an air cooling system 32, an air dehumidifying system 33 and a Centre Controller Unit (CCU). The said air filtering system 31 is also act as an air purifying system. The said air dehumidifying system 33 is to dehumidify the air and control the relative humidity in said working chamber 1. In this invention, the said air dehumidifying system 33 provides a low humidity air stream at approximately 5% to 35% relative humidity to said low humidity tunnel 29 at said dehydrating station 9. Another unit of said air dehumidifying system 33 provides an ultra-low humidity air stream at approximately 0.1% to 30% relative humidity to said ultra-low humidity air stream nozzle 18 at said depositing station 8. It is one of the critical features of the present invention to channel said ultra-low humidity air stream onto a freshly deposited fluid biotic material to immediately dehydrate said deposited fluid biotic material, where at least convert the outer surface region of said deposited fluid biotic material to a solid or semi-solid region, which will minimise said deposited biotic material based structure or object from deforming.

Figure 13:
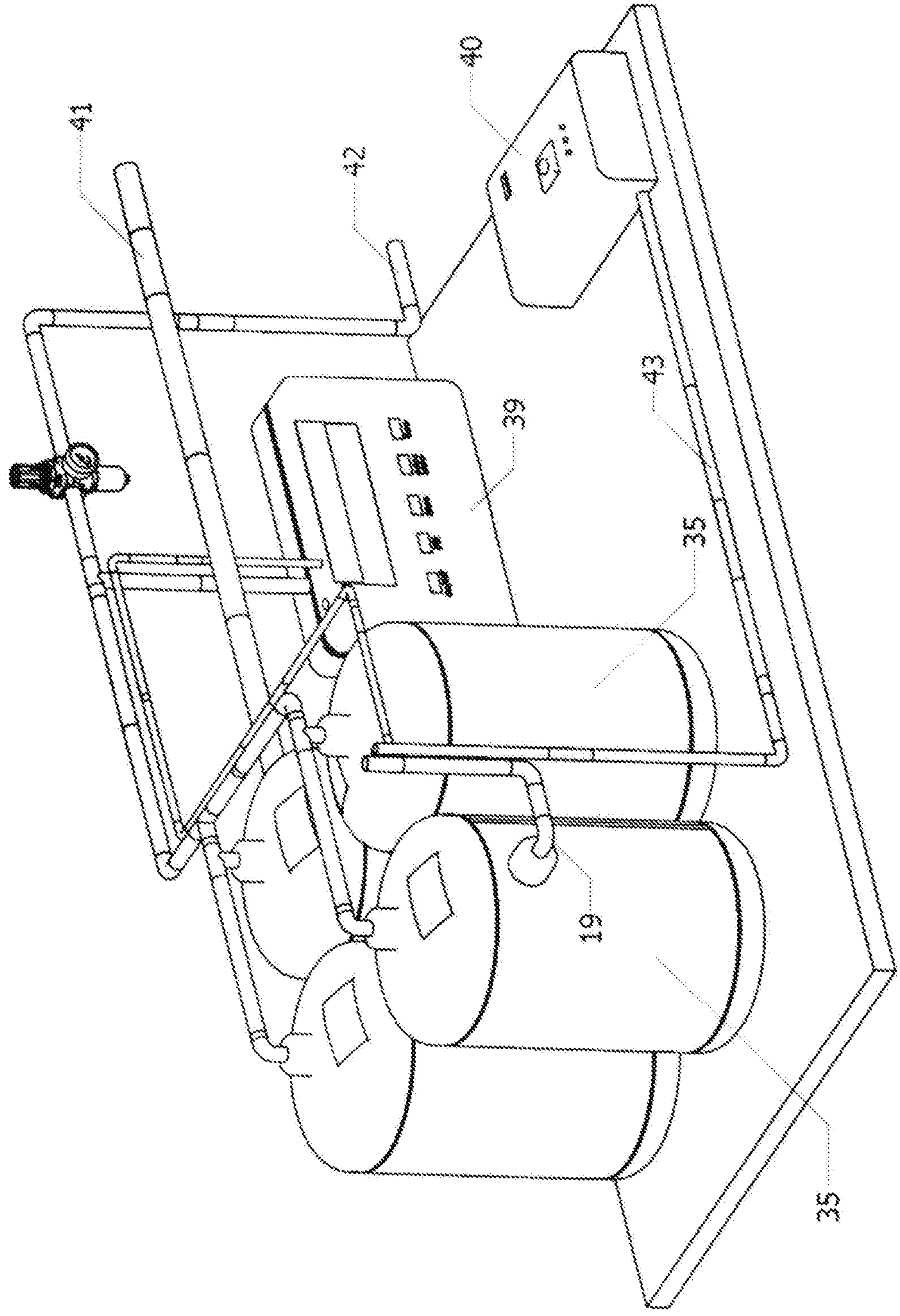
FIG. 13 shows a perspective view of a lower chamber (without covers and doors) of said system for three dimensional printing of biotic materials in accordance with the present invention.
Figure 14:
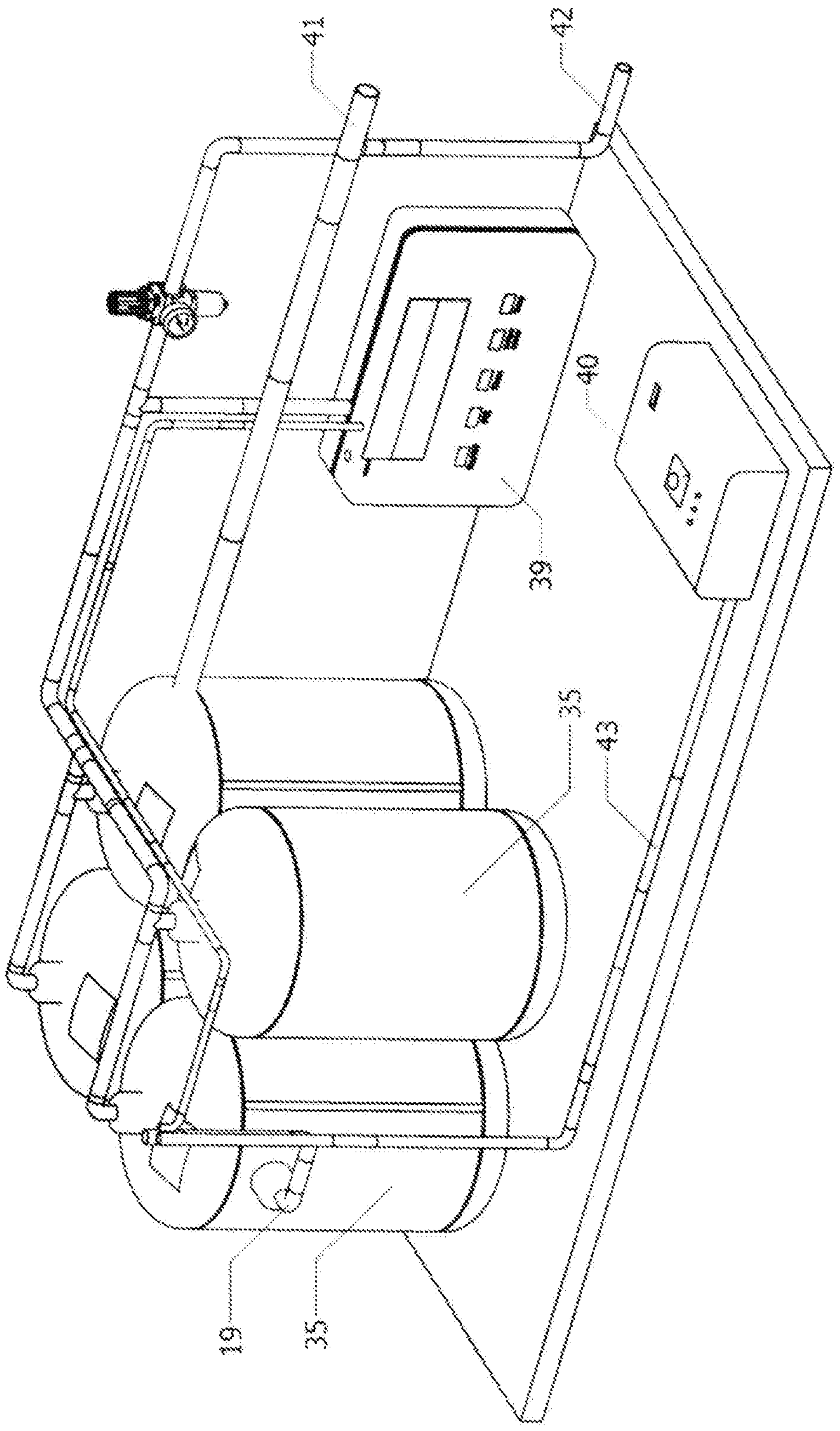
FIG. 14 shows another perspective view of a lower chamber (without covers and doors) of said system for three dimensional printing of biotic materials in accordance with the present invention.

Referring to FIG. 13 and FIG. 14, said lower chamber 3 consists of a fluid biotic material reservoir 35, a fluid biotic material piping 19, a deposition controller system 39, an Ozone gas generator 40 and an Ozone gas piping 43. The said fluid biotic material is being prepared off line, then loaded into said fluid biotic material reservoir 35 thru a fluid biotic material inlet piping 41. Ozone gas is generated by the said Ozone generator 40, then channelled to said working chamber 1 thru said Ozone gas piping 43. In this invention, the Ozone gas outlet is preferably located in front of said low humidity tunnel 29. The said Ozone gas or other gas mixture is used to sanitise the said working chamber 1.

Figure 15:
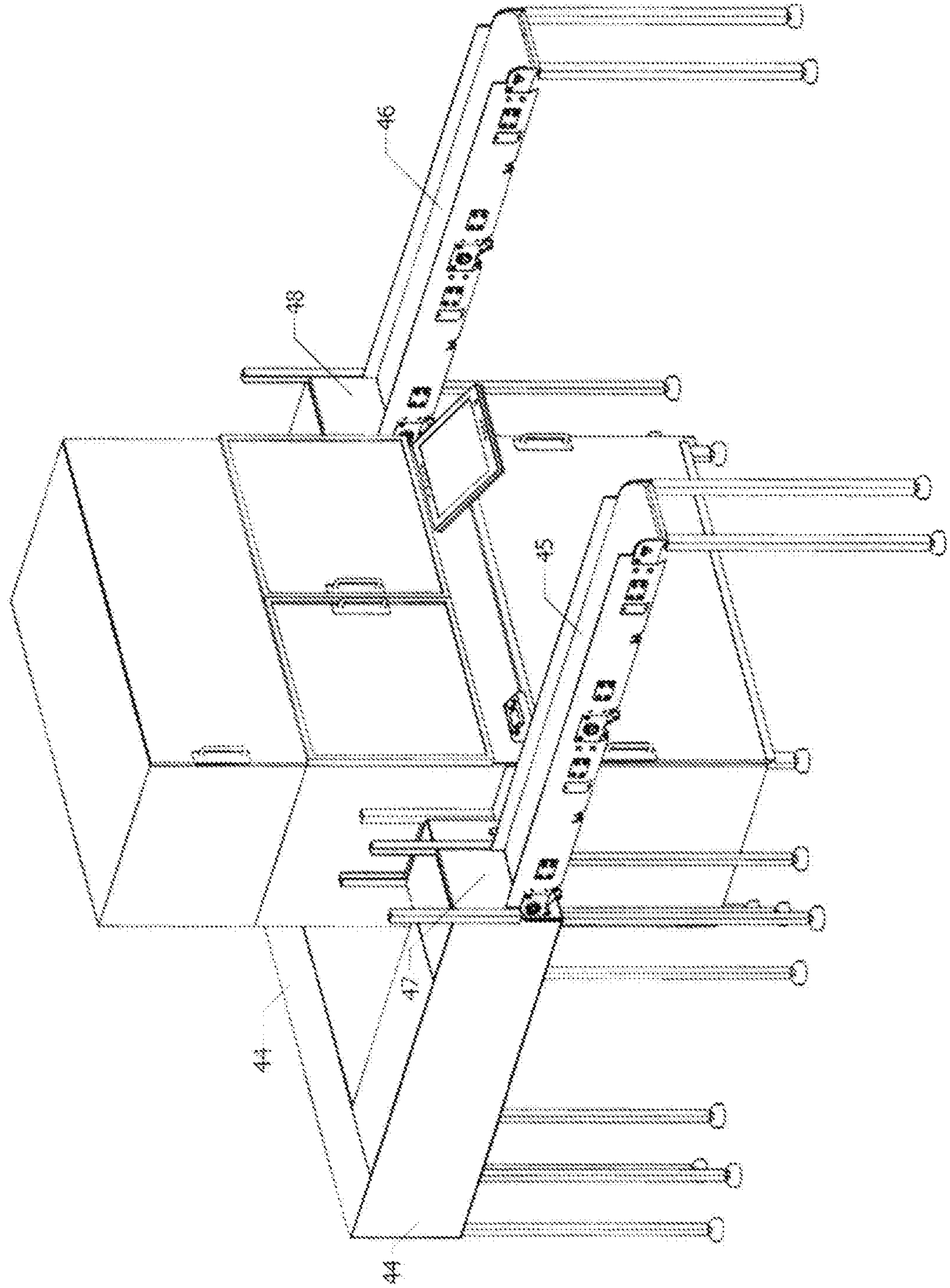
FIG. 15 shows a perspective view of a system equipped with extended loading conveyor, extended unloading conveyor and an enclosed chamber return conveyor system for three dimensional printing of biotic materials in accordance with the present invention.

FIG. 15 illustrated another embodiment of the present invention, said biotic material based object printing system is preferably further equipped with an enclosed returning conveyor system 44, an extended loading conveyor system 45, an extended unloading conveyor system 46, an extended loading conveyor gate 47 and an extended unloading conveyor gate 48. The function of said enclosed returning conveyor system 44 is to transfer said deposited fluid biotic material on said deposition platforms 10 from said dehydrating station 9 to said waiting station 7 or said extended unloading conveyor 45. In this invention, one of the main function of said enclosed returning conveyor system 44 is to transfer the said deposition platform 10 with deposited fluid biotic material back to said waiting station 7 for the subsequence depositing process till the pre-programmed structure or object is formed or completed.

Figure 16:
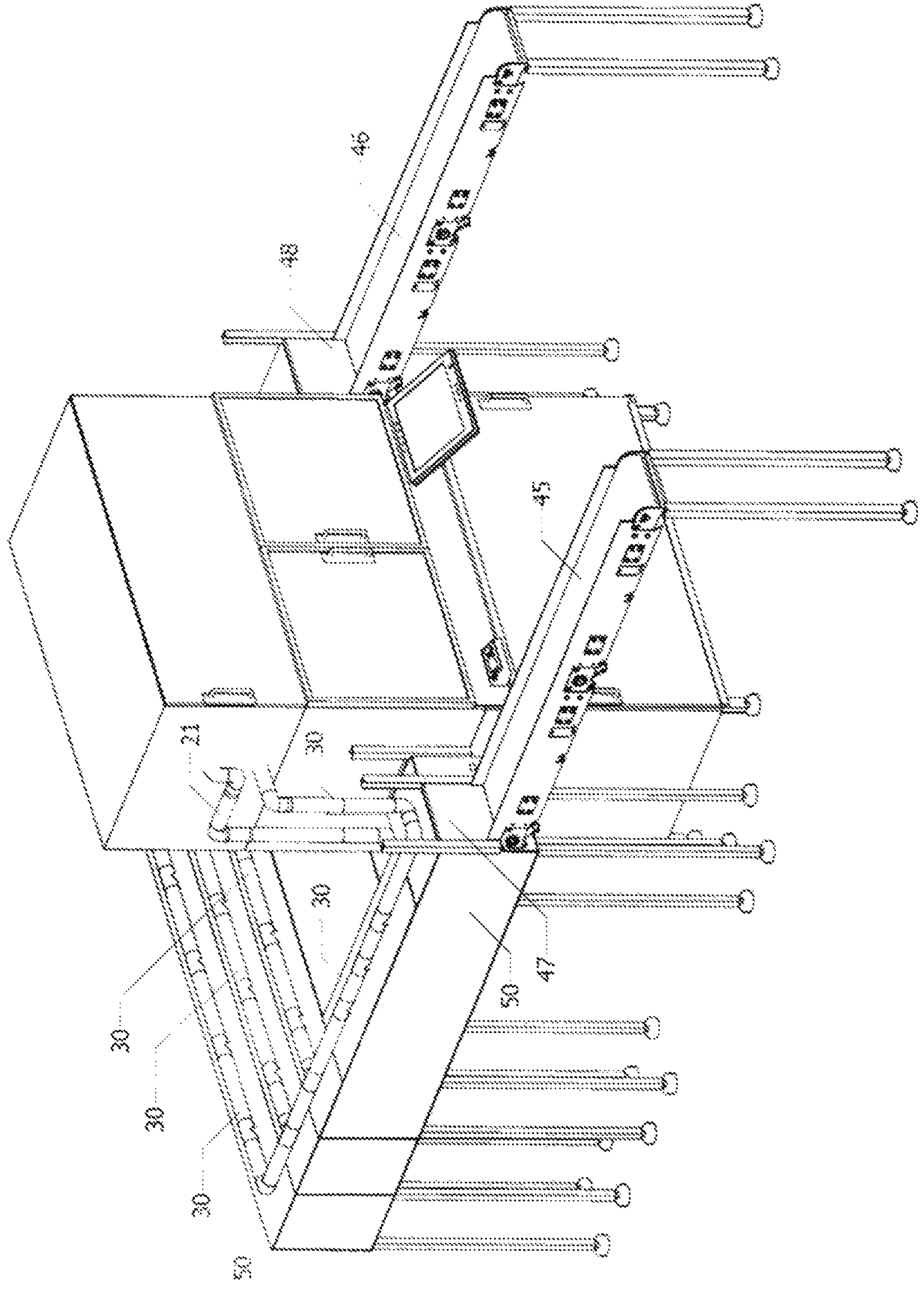
FIG. 16 shows a perspective view of a system equipped with extended loading conveyor, extended unloading conveyor and an enclosed low humidity returning conveyor system for three dimensional printing of biotic materials in accordance with the present invention.

Yet another embodiment according to present invention is illustrated in FIG. 16, said biotic material based object printing system is preferably further equipped with an enclosed low humidity returning conveyor system 50, an extended loading conveyor system 45, an extended unloading conveyor system 46, an extended loading conveyor gate 47 and an extended unloading conveyor gate 48.

The said enclosed low humidity returning conveyor system 50 is set-up with a controlled environment, which act like a low humidity tunnel with conveyor. The said enclosed low humidity returning conveyor system 50 have two critical functions.

The first function is to transfer said deposited fluid biotic material on said deposition platforms 10 from said dehydrating station 9 to said waiting station 7 or said extended unloading conveyor 48. In this invention, the said deposited fluid biotic material on said deposition platform 10 is transferring back to said waiting station 7 for the subsequence depositing process till the pre-programmed structure or object is formed or completed.

The second function of the said enclosed low humidity returning conveyor system 50 is to act as a buffering and an additional dehydrating station, which dehydrate said deposited fluid biotic material on said deposition platforms 10 during buffering or transferring on the said enclosed low humidity returning conveyors system 50.

The said enclosed low humidity returning conveyor system 50 is preferably equipped with a plurality of enclosed return conveyor lanes as shown in FIG. 16. The additional enclosed return conveyor lanes could be used as a buffering lane and to provide an additional dehydration for the said deposited fluid biotic material on said deposition platforms 10 before said deposition platform 10 are returning to the said waiting station 7 or transferring to said extended unloading conveyor 46. In the present invention, the said enclosed low humidity returning conveyor system 50 is circulated with dehumidified, cooled, filtered and/or sanitised air to avoid the said deposited fluid biotic material from degrading during the buffering, transferring and dehydrating processes.

There are a plurality of process flow combination in implementing present invention. Three examples are illustrated in this invention disclosures:

Example #1

Figure 17:
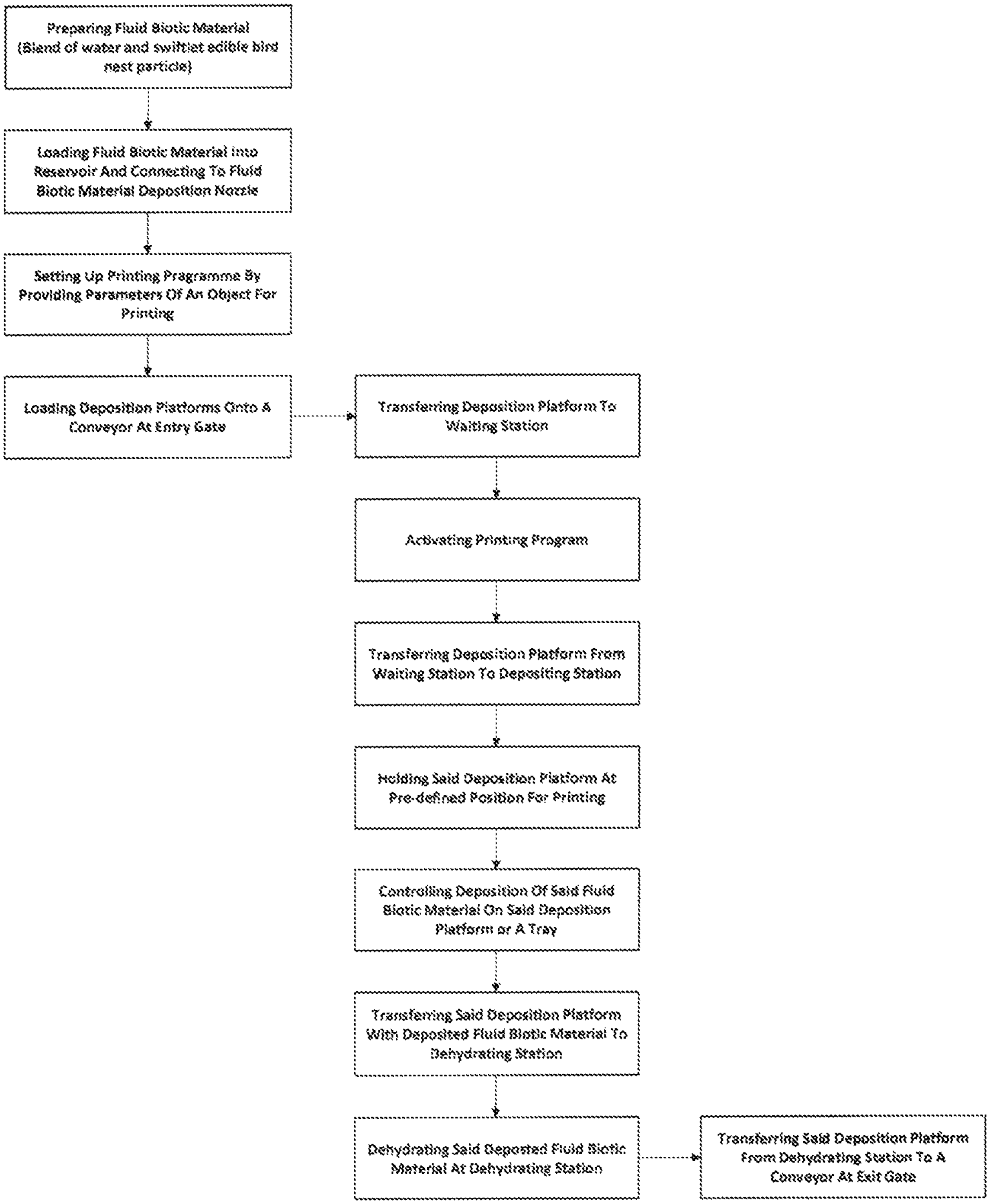
FIG. 17 illustrates a prefer example #1 for three dimensional printing of biotic materials in accordance with the present invention.

According to example #1 of present invention as shown in FIG. 17, the method of printing biotic material based object from biotic material originated from swiftlet edible bird nest comprising of the following steps:

a) preparing a fluid biotic material comprising of a blend of water and swiftlet edible bird nest particles;
b) loading said fluid biotic material into a fluid biotic material reservoir 35 and connecting to a fluid biotic material deposition nozzle 17;

c) setting up a printing programme by providing parameters of an object for printing or depositing;
d) loading a plurality of deposition platforms 10 onto a conveyor at entry gate 4;
e) transferring said deposition platform 10 to a waiting station 7;
f) activating said printing programme at a Man-Machine Interface Unit (MMIU) 36;
g) transferring said deposition platform 10 from said waiting station 7 to a depositing station 8;
h) holding said deposition platform 10 at a pre-defined position by a deposition platform holding or clamping mechanism 13 in said depositing station 8 for printing or depositing;
i) controlling a deposition of said fluid biotic material on said deposition platform 10 or a detachable tray 24 sitting on the said deposition platform 10;
j) transferring said deposition platform 10 with said deposited fluid biotic material to a dehydrating station 9;
k) dehydrating said deposited fluid biotic material at said dehydrating station 9;
l) transferring said deposition platform 10 from dehydrating station 9 to a conveyor at exit gate 5 and unloading the said deposition platform 10 with said deposited fluid biotic material.

According to example #1 of present invention as shown in FIG. 17. The first step is to prepare a fluid biotic material comprising of a blend of water and swiftlet edible bird nest particles. The said swiftlet edible bird nest particles consist of micrometre-sized and/or nanometre-sized particles. Completely blend said water with said swiftlet edible bird nest particles.

The second step is to load said fluid biotic material into a fluid biotic material reservoir 35 and connecting to a fluid biotic material deposition nozzle 17 thru a fluid biotic material piping 19.

The third step is to set up a printing programme by providing parameters of an object for printing or depositing thru a Man-Machine Interface Unit (MMIU) 36.

The fourth step is to load a plurality of deposition platforms 10 onto a conveyor at an entry gate 4.

The fifth step is to transfer said deposition platform 10 from said entry gate 4 to a waiting station 7.

The sixth step is to activate said printing programme at said Man-Machine Interface Unit (MMIU) 36.

The seventh step is to transfer said deposition platform 10 from said waiting station 7 to a depositing station 8 for printing or depositing process.

The eighth step is to hold said deposition platform 10 at a pre-defined position by a deposition platform holding or clamping mechanism 13 in said depositing station 8 for printing or depositing.

The ninth step is to control a deposition of said fluid biotic material on said deposition platform 10 or a detachable tray 24 sitting on the said deposition platform 10. Said Centre Controller Unit (CCU) 34 is configured to control the deposition of the fluid biotic material so as to form a solid structure that at least the outer surface region of the fluid biotic material is converted to a solid or semi-solid region after deposition and subsequent dehydration process.

The tenth step is to transfer said deposition platform 10 with said deposited fluid biotic material to a dehydrating station 9.

The eleventh step is to dehydrate said deposited fluid biotic material in said low humidity tunnel 29 at said dehydrating station 9.

The final step is to transfer said deposition platform 10 from dehydrating station 9 to a conveyor at exit gate 5 and unloading the said deposition platform 10 with said deposited fluid biotic material.

Example #2

Figure 18:
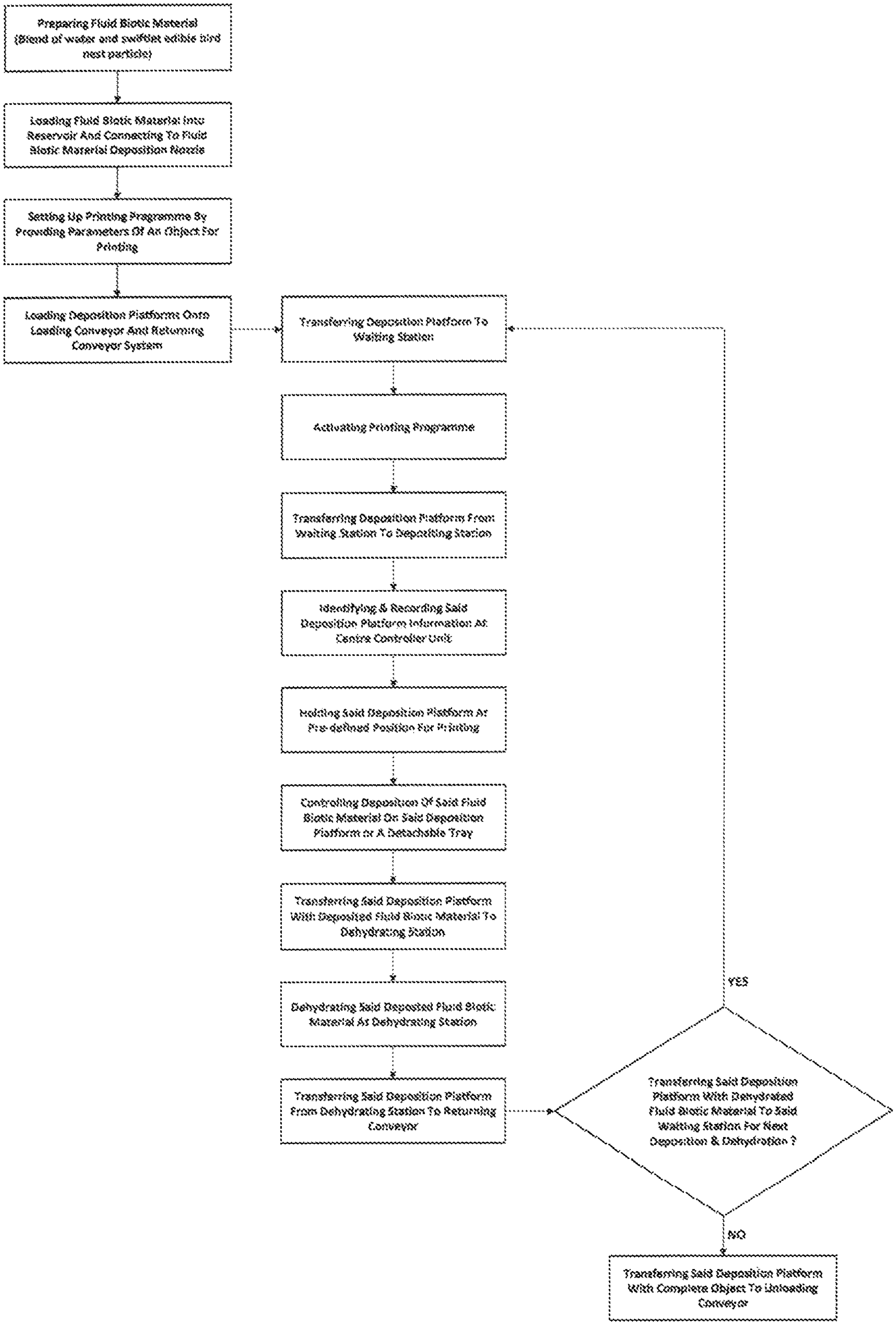
FIG. 18 illustrates a prefer example #2 for three dimensional printing of biotic materials in accordance with the present invention.

According to example #2 of present invention as shown in FIG. 18, the method of printing biotic material based object from biotic material originated from swiftlet edible bird nest comprising of the following steps:

a) preparing a fluid biotic material comprising of a blend of water and swiftlet edible bird nest particles;
b) loading said fluid biotic material into a fluid biotic material reservoir 35 and connecting to a fluid biotic material deposition nozzle 17;
c) setting up a printing programme by providing parameters of an object for printing or depositing;
d) loading a plurality of deposition platforms 10 onto an extended loading conveyor 45 and an enclosed returning conveyor system 44;
e) transferring said deposition platform 10 to a waiting station 7;
f) activating said printing programme at a Man-Machine Interface Unit (MMIU) 36;
g) transferring said deposition platform 10 from said waiting station 7 to a depositing station 8;
h) identifying said deposition platform 10, decoding information and recording the information at a centre controller such as a Centre Controller Unit (CCU) 34;
i) holding said deposition platform 10 at a pre-defined position by a deposition platform holding or clamping mechanism 13 in said depositing station 8 for printing or depositing;
j) controlling a deposition of said fluid biotic material on said deposition platform 10 or a detachable tray 24 sitting on the said deposition platform 10;
k) transferring said deposition platform 10 with said deposited fluid biotic material to a dehydrating station 9;
l) dehydrating said deposited fluid biotic material at said dehydrating station 9;
m) transferring said deposition platform 10 with said deposited fluid biotic material from said dehydrating station 9 to an enclosed returning conveyor 44;
n) transferring said deposition platform 10 with said deposited fluid biotic material from said enclosed returning conveyor 44 to said waiting station 7 as shown in step “e”, repeat step “e” to step “m” till an object or structure are formed or completed; and
o) transferring said deposition platform 10 with completed object to extended unloading conveyor 46 and unloading the said completed object.

According to example #2 of present invention as shown in FIG. 18. The first step is to prepare a fluid biotic material comprising of a blend of water and swiftlet edible bird nest particles. The said swiftlet edible bird nest particles consist of micrometre-sized and/or nanometre-sized particles. Completely blend said water with said swiftlet edible bird nest particles.

The second step is to load said fluid biotic material into a fluid biotic material reservoir 35 and connecting to a fluid biotic material deposition nozzle 17 thru a fluid biotic material piping 19.

The third step is to set up a printing programme by providing parameters of an object for printing or depositing thru a Man-Machine Interface Unit (MMIU) 36.

The fourth step is to load a plurality of deposition platforms 10 onto an extended loading conveyor 45 and an enclosed returning conveyor system 44. The said deposition platforms 10 will be transferred from said extended loading conveyor 45 to said enclosed returning conveyor 44.

The fifth step is to transfer said deposition platform 10 from said enclosed returning conveyor 44 to a waiting station 7.

The sixth step is to activate said printing programme at said Man-Machine Interface Unit (MMIU) 36.

The seventh step is to transfer said deposition platform 10 from said waiting station 7 to a depositing station 8 for printing or depositing process.

The eighth step is to identify said deposition platform 10. A deposition platform identification system will read and decode the information. Then, submit the information to a centre controller such as a Centre Controller Unit (CCU) 34.

The ninth step is to hold said deposition platform 10 at a pre-defined position by a deposition platform holding or clamping mechanism 13 in said depositing station 8 for printing or depositing.

The tenth step is to control a deposition of said fluid biotic material on said deposition platform 10 or a detachable tray 24 sitting on the said deposition platform 10. Said Centre Controller Unit (CCU) 34 is configured to control the deposition of the fluid biotic material so as to form a solid structure that at least the outer surface region of the fluid biotic material is converted to a solid or semi-solid region after deposition and subsequent dehydration process.

The eleventh step is to transfer said deposition platform 10 with said deposited fluid biotic material to a dehydrating station 9.

The twelfth step is to dehydrate said deposited fluid biotic material in said low humidity tunnel 29 at said dehydrating station 9.

The thirteenth step is to transfer said deposition platform 10 with said deposited fluid biotic material from said dehydrating station 9 to an enclosed returning conveyor 44.

The fourteenth step is to transfer said deposition platform 10 with said deposited fluid biotic material from said enclosed returning conveyor 44 to said waiting station 7 as shown in the fifth step. Then repeat the fifth step to the thirteenth step till an object or structure are formed or completed.

The final step is to transfer said deposition platform 10 with a completed object to said extended unloading conveyor 46 and unloading the said completed object.

Example #3

Figure 19:
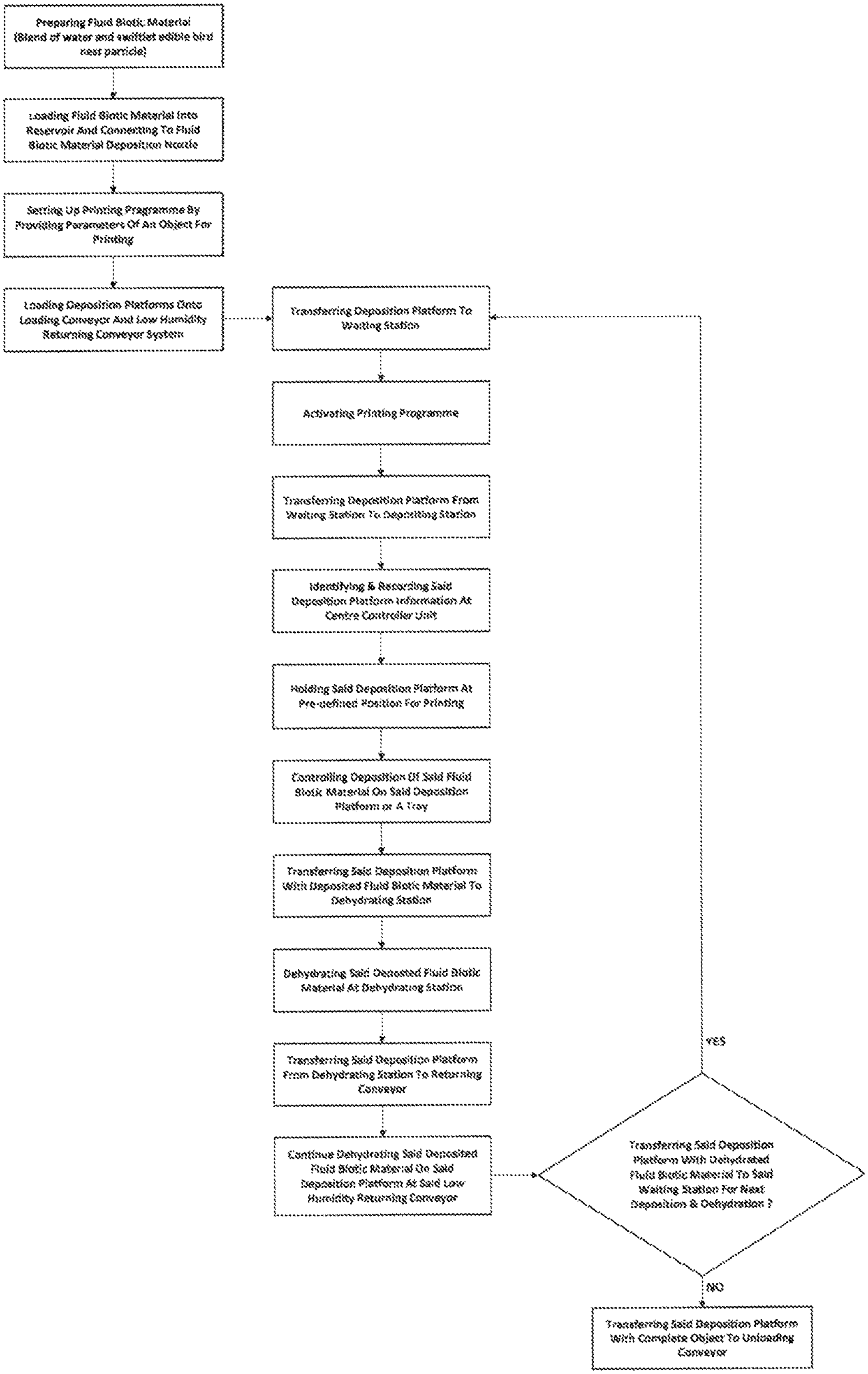
FIG. 19 illustrates a prefer example #3 for three dimensional printing of biotic materials in accordance with the present invention.

According to example #3 of present invention as shown in FIG. 19, the method of printing biotic materials based objects from biotic materials originated from swiftlet edible bird nest comprising of the following steps:

a) preparing a fluid biotic material comprising of a blend of water and swiftlet edible bird nest particles;
b) loading said fluid biotic material into a fluid biotic material reservoir 35 and connecting to a fluid biotic material deposition nozzle 17;
c) setting up a printing programme by providing parameters of an object for printing;
d) loading a plurality of deposition platforms 10 onto an extended loading conveyor 45 and an enclosed low humidity returning conveyor system 50;
e) transferring said deposition platform 10 to a waiting station 7;
f) activating said printing programme at a Man-Machine Interface Unit (MMIU) 36;
g) transferring said deposition platform 10 from said waiting station 7 to a depositing station 8;
h) identifying said deposition platform 10, decoding the information and recording the information at a centre controller such as a Centre Controller Unit (CCU) 34;
i) holding said deposition platform 10 at a pre-defined position by a deposition platform holding or clamping mechanism 13 in said depositing station 8 for printing or depositing;
j) controlling a deposition of said fluid biotic material on said deposition platform 10 or a detachable tray 24 sitting on the said deposition platform 10;
k) transferring said deposition platform 10 with said deposited fluid biotic material to a dehydrating station 9;
l) dehydrating said deposited fluid biotic material at said dehydrating station 9;
m) transferring said deposition platform 10 with said deposited fluid biotic material from said dehydrating station 9 to an enclosed low humidity returning conveyor 50;
n) continue dehydrating said deposited biotic material on said deposition platform 10 at said enclosed low humidity returning conveyor 50 till at least an outer surface region of said fluid biotic material is converted to a solid or semi-solid region;
o) transferring said deposition platform 10 with said deposited fluid biotic material from said enclosed low humidity returning conveyor 50 to said waiting station 7 as shown in step "e", repeat step "e" to step "n" till an object or structure are formed or completed; and
p) transferring said deposition platform 10 with completed object to said extended unloading conveyor 46 and unloading the said completed object.

According to example #3 of present invention as shown in FIG. 19. The first step is to prepare a fluid biotic material comprising of a blend of water and swiftlet edible bird nest particles. The said swiftlet edible bird nest particles consist of micrometre-sized and/or nanometre-sized particles. Completely blend said water with said swiftlet edible bird nest particles.

The second step is to load said fluid biotic material into a fluid biotic material reservoir 35 and connecting to a fluid biotic material deposition nozzle 17 thru a fluid biotic material piping 19.

The third step is to set up a printing programme by providing parameters of an object for printing thru a Man-Machine Interface Unit (MMIU) 36.

The fourth step is to load a plurality of deposition platforms 10 onto an extended loading conveyor 45 and an enclosed low humidity returning conveyor system 50. The said deposition platforms 10 will be transferred from said extended loading conveyor 45 to said enclosed low humidity returning conveyor 50.

The fifth step is to transfer said deposition platform 10 from said enclosed low humidity returning conveyor 50 to a waiting station 7.

The sixth step is to activate said printing programme at said Man-Machine Interface Unit (MMIU) 36.

The seventh step is to transfer said deposition platform 10 from said waiting station 7 to a deposition station 8 for printing or depositing process.

The eighth step is to identify said deposition platform 10. A deposition platform identification system will read and decode the information. Then, submit the information to a centre controller such as a Centre Controller Unit (CCU) 34.

The ninth step is to hold said deposition platform 10 at a pre-defined position by a deposition platform holding or clamping mechanism 13 in said depositing station 8 for printing or depositing.

The tenth step is to control a deposition of said fluid biotic material on said deposition platform 10 or a detachable tray 24 sitting on the said deposition platform 10. Said Centre Controller Unit (CCU) 34 is configured to control the deposition of the fluid biotic material so as to form a solid structure that at least the outer surface region of the fluid biotic material is converted to a solid or semi-solid region after deposition and subsequent dehydration process.

The eleventh step is to transfer said deposition platform 10 with said deposited fluid biotic material to a dehydrating station 9.

The twelfth step is to dehydrate said deposited fluid biotic material in said low humidity tunnel 29 at said dehydrating station 9.

The thirteenth step is to transfer said deposition platform 10 with said deposited fluid biotic material from said dehydrating station 9 to an enclosed low humidity returning conveyor 50.

The fourteenth step is to continue dehydrating said deposited biotic material on said deposition platform 10 at said enclosed low humidity returning conveyor 50 till at least an outer surface region of said fluid biotic material is converted to a solid or semi-solid region.

The fifteenth step is to transfer said deposition platform 10 with said deposited fluid biotic material from said enclosed low humidity returning conveyor 50 to said waiting station 7 as shown in the fifth step. Then repeat the fifth step to the fourteenth step till an object or structure are formed or completed.

The final step is to transfer said deposition platform 10 with a completed object to said extended unloading conveyor 46 and unloading the said completed object.

Although the invention has been described in detail for the purpose of illustration, it is understood that such detail is solely for that purpose. It is also to be noted that the present invention is susceptible to modifications, adaptations and changes by those skilled in the art. Such variant embodiments employing the concepts and features of this invention are intended to be within the scope of the present invention, which is further set forth under the following claims.

What is claimed is:

1. A method of three-dimensional printing a biotic material comprising steps:

(a) providing a three-dimensional printer system configured to print a three-dimensional object from a biotic material, the three-dimensional printer system having a printing nozzle and dehydration system in an enclosed working chamber, wherein the printing nozzle is attached to a multi-axis robotic mechanism;

(b) forming the biotic material, wherein the biotic material comprises a blend of materials including swiftlet edible bird nest particles and water;

(c) depositing, via the printing nozzle, a plurality of globules of the biotic martial in connecting stacks at preprogrammed locations such that the plurality of globules form the three-dimensional object; and, (d) dehydrating, via the dehydration system, the three-dimensional object, wherein the dehydration system provides 0.1% to 30% relative humidity via an air stream nozzle.

2. The method of claim 1, wherein the swiftlet edible bird nest particles consist of nanometer sized particles ranging from 1 to 999 nanometers.

3. The method of claim 1, wherein the swiftlet edible bird nest particles consist of micrometer sized particles ranging from 1 to 999 micrometers.

4. The method of claim 1, wherein the enclosed chamber is circulated with dehumidified, cooled, and filtered air to avoid the biotic material from degrading.

5. The method of claim 1, wherein the three-dimensional printer system is controlled via a center controller such that the center controller is configured to control the multi-axis robotic mechanism in step (c).

6. The method of claim 1, further comprising a step of heating up and/or cooling down the biotic material prior to step (c).

7. The method of claim 1, further comprising a controlling the depositing pressure and flow rate at the preprogrammed locations during step (c).

8. The method of claim 1, wherein the biotic material further comprises edible ingredients which are not swiftlet edible bird nest particles.

9. The method of claim 1, where the enclosed working chamber has a controlled environment of temperature and humidity.

* * * * *